US010829036B2

(12) United States Patent
Sugiyama et al.

(10) Patent No.: US 10,829,036 B2
(45) Date of Patent: Nov. 10, 2020

(54) ROAD SIGN PROJECTOR AND VEHICLE LAMP

(71) Applicant: MAXELL, LTD., Kyoto (JP)

(72) Inventors: Toshinori Sugiyama, Kyoto (JP); Yasuhiko Kunii, Kyoto (JP); Koji Hirata, Kyoto (JP); Masahiro Kishigami, Kyoto (JP); Yuji Tsuchiya, Saitama (JP); Go Shimizu, Saitama (JP); Masayoshi Takori, Saitama (JP); Ryuya Kawaji, Saitama (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/387,156

(22) Filed: Apr. 17, 2019

(65) Prior Publication Data
US 2019/0322209 A1 Oct. 24, 2019

(30) Foreign Application Priority Data

| Apr. 18, 2018 | (JP) | 2018-080244 |
| Apr. 18, 2018 | (JP) | 2018-080245 |
| Jul. 27, 2018 | (JP) | 2018-141498 |

(51) Int. Cl.
| *B60Q 1/34* | (2006.01) |
| *F21S 43/20* | (2018.01) |
| *F21S 43/14* | (2018.01) |
| *F21Y 115/10* | (2016.01) |
| *F21W 103/20* | (2018.01) |

(52) U.S. Cl.
CPC ............... *B60Q 1/34* (2013.01); *F21S 43/14* (2018.01); *F21S 43/26* (2018.01); *B60Q 2400/50* (2013.01); *F21W 2103/20* (2018.01); *F21Y 2115/10* (2016.08)

(58) Field of Classification Search
CPC .. B60Q 1/34; B60Q 1/38; B60Q 1/503; F21S 43/14; F21S 43/26
See application file for complete search history.

(56) References Cited

U.S. PATENT DOCUMENTS

| 7,791,458 B2 * | 9/2010 | Shimaoka | B60Q 1/085 340/435 |
| 10,040,392 B2 * | 8/2018 | Salter | B60Q 1/323 |
| 10,173,577 B2 * | 1/2019 | Albou | G06F 3/011 |
| 10,399,483 B2 * | 9/2019 | Johnson | F21S 43/10 |
| 2005/0117364 A1 * | 6/2005 | Rennick | B60R 1/1207 362/540 |

(Continued)

FOREIGN PATENT DOCUMENTS

| JP | H08-043781 A | 2/1996 |
| JP | 2004-136838 A | 5/2004 |

(Continued)

*Primary Examiner* — Leah Simone Macchiarolo
(74) *Attorney, Agent, or Firm* — Volpe Koenig

(57) ABSTRACT

Each of a road sign projector and a vehicle lamp operates in an assumed usage temperature of a car, and has reduced power consumption and reduced device cost. A road sign projector displays images onto a plurality of regions of a road surface. The road sign projector includes: shades each configured to shape image projection light into a predetermined shape corresponding to the image for each of the regions; and projection lenses corresponding to the regions. The projection lenses are different from one another in at least a focal length and axial inclination.

13 Claims, 21 Drawing Sheets

(56) References Cited

U.S. PATENT DOCUMENTS

| | | | | |
|---|---|---|---|---|
| 2007/0053195 A1* | 3/2007 | Alberti | ............... | B60Q 1/2665 362/494 |
| 2007/0120137 A1* | 5/2007 | Wilson | ................... | F21V 29/89 257/98 |
| 2010/0017111 A1* | 1/2010 | Stefani | .................... | B60Q 1/50 701/533 |
| 2011/0128141 A1* | 6/2011 | Purks | ...................... | B60Q 1/38 340/475 |
| 2011/0273671 A1* | 11/2011 | Chu | ...................... | G03B 21/14 353/13 |
| 2012/0044090 A1* | 2/2012 | Kahler | .................... | B60Q 1/50 340/905 |
| 2015/0203023 A1* | 7/2015 | Marti | ...................... | B60Q 1/00 340/425.5 |
| 2016/0257243 A1* | 9/2016 | Son | ......................... | B60Q 1/50 |
| 2017/0198877 A1* | 7/2017 | Suwa | ...................... | F21S 41/36 |
| 2019/0390836 A1* | 12/2019 | Hirata | .................... | F21S 41/13 |

FOREIGN PATENT DOCUMENTS

| | | |
|---|---|---|
| JP | 2005-142060 A | 6/2005 |
| JP | 2017-183287 A | 10/2017 |

\* cited by examiner

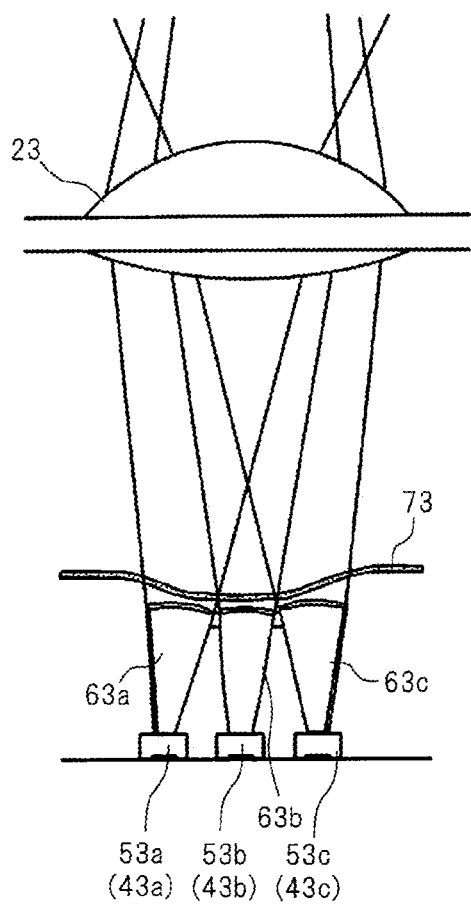
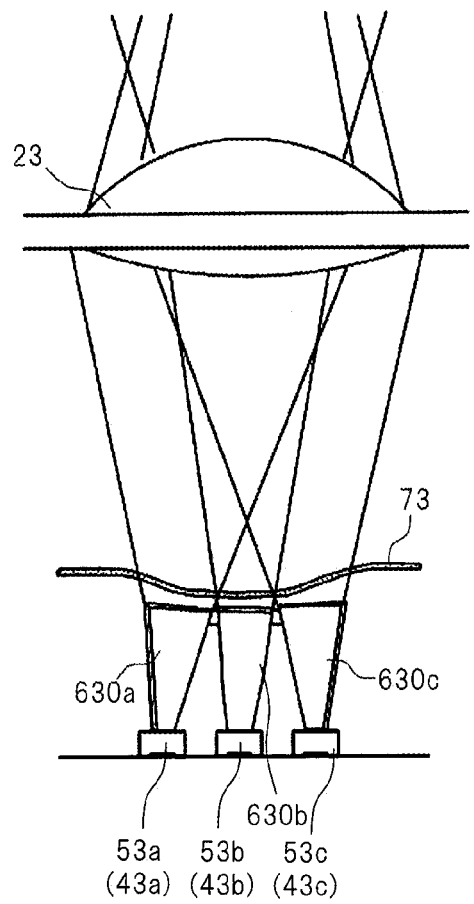

ROAD SIGN PROJECTOR AND VEHICLE LAMP

CROSS-REFERENCE TO RELATED APPLICATION

The present application claims priority from Japanese Patent Applications No. 2018-080244 filed on Apr. 18, 2018, No. 2018-080245 filed on Apr. 18, 2018, and No. 2018-141498 filed on Jul. 27, 2018, the contents of which are hereby incorporated by reference into this application.

TECHNICAL FIELD OF THE INVENTION

The present invention relates to a road sign projector and a vehicle lamp.

BACKGROUND OF THE INVENTION

Sign projectors represented by a projector have been already used in various fields as apparatuses for enlarging and projecting desired images. In recent years, the apparatuses have been also variously used as display apparatuses for enlarging and displaying screens of personal computers or mobile phones. Further, the image projector that is mounted on a vehicle has been also used as a road sign projector that projects images onto a road surface.

Such a road sign projector is known in, for example, Japanese Patent Application Laid-Open Publication No. H08-43781 (Patent Document 1) and Japanese Patent Application Laid-Open Publication No. 2004-136838 (Patent Document 2) described below. The Patent Document 1 discloses a projection display apparatus that projects images onto a road surface while using a vehicle headlight as an external light source. According to the Patent Document 1, this projection display apparatus has low power consumption and is excellent in portability.

A projector described in the Patent Document 2 is built in a vehicle, and is arranged in front of a headlight. When the headlight is functioning, the projector is arranged so as not to block a light path going from the headlight to a light taking-out port. When the projector is functioning, the projector is arranged in the light path going from the headlight to the light taking-out port, and projects optical images outward while using the headlight as the light source. The projector displays, for example, information related to a present position of a car, information related to a traveling direction, etc., as the optical images onto a road.

According to the Patent Document 2, a workload that is necessary for allowing the images to be displayed can be extremely small, and this work is extremely easy to be performed, so that setting work can be automated.

The vehicle lamp is known in, for example, Japanese Patent Application Laid-Open Publication No. 2005-142060 (Patent Document 3) and Japanese Patent Application Laid-Open Publication No. 2017-183287 (Patent Document 4) described below. The Patent Document 3 discloses an auxiliary signal lamp with light emitting means having LEDs that are arranged in one row along a longitudinal direction. The Patent Document 4 discloses a vehicle lamp that enables sequential display. The vehicle lamp of the Patent Document 4 includes a light source unit on which four LED light sources are mounted and a light guiding body that emits light frontward, the light being emitted from the LED light sources. This vehicle lamp performs the sequential display by sequentially turning on or sequentially turning off three or more LED light sources.

SUMMARY OF THE INVENTION

However, operations of the projector mounted on the car are difficult under temperature conditions that are equal to or smaller than 0° C. and equal to or larger than 60° C. that are assumed usage environment of the car and vibration environment caused from the vehicle. And, since the power consumption of the projector is large, a power supply for handling this is necessary. In the Patent Document 2, one optical system projects images onto a wide region of the road surface, and therefore, image quality deterioration of the images in a peripheral portion is caused by aberration. In order to prevent such image quality deterioration, an optical system having a plurality of expensive glass materials is necessary. In this case, the road sign projector becomes undesirably expensive.

Further, while the vehicle lamp has many other constituent parts, downsizing in a size is necessary. And, since a substrate, etc., that controls an LED light source or a light source with a conventional function is formed on the vehicle lamp, the apparatus cost is high.

The present invention has been made in consideration of the above-described problems in the conventional techniques, and an object of the present invention is to provide a road sign projector and a vehicle lamp, each of which functions even in the assumed usage temperature and the vibration environment of the car, is reduced in the power consumption and the apparatus cost, and is downsized in the apparatus size.

The summary of the typical aspects of the inventions disclosed in the present application will be briefly described as follows.

A road sign projector according to a typical embodiment of the present invention displays images onto a plurality of regions of a road surface. The road sign projector includes: a shade configured to shape image projection light into a predetermined shape corresponding to the image for each of the regions; and a projection optical system corresponding to each of the regions.

A vehicle lamp according to another typical embodiment of the present invention includes: a road sign projector configured to display images onto a plurality of regions of a road surface; and a directional indicator. The road sign projector has: a shade configured to shape image projection light into a predetermined shape corresponding to the image for each of the regions; and a projection lens corresponding to each of the regions. The directional indicator has a directional-indicator display unit corresponding to each of the regions. Each directional-indicator display unit displays a directional indicator when the image is displayed in the corresponding region.

The effects obtained by the typical aspects of the invention disclosed in the present application will be briefly described below.

That is, according to the typical embodiment of the present invention, a road sign projector and a vehicle lamp, each of which functions in the assumed usage temperature of the car and is reduced in the power consumption and the apparatus cost, can be provided.

BRIEF DESCRIPTIONS OF THE DRAWINGS

FIG. 8A is a diagram showing a shape of a light guide and the emitted image projection light so as to correspond to each other;

FIG. 8B is a diagram showing the shape of the light guide and the emitted image projection light so as to correspond to each other;

DESCRIPTIONS OF THE PREFERRED EMBODIMENTS

Hereinafter, examples of embodiments of the present invention will be described with reference to the accompanying drawings. Note that the embodiments described below are one example for achieving the present invention, and shall be appropriately corrected or modified depending on the configurations and the various conditions of the apparatuses to which the present invention is applied. The present invention is not limited to the following embodiments. Further, a part of each embodiment described later may be configured in appropriate combination.

First Embodiment

<Arrangement State of Road Sign Projector>

Figure 1A:
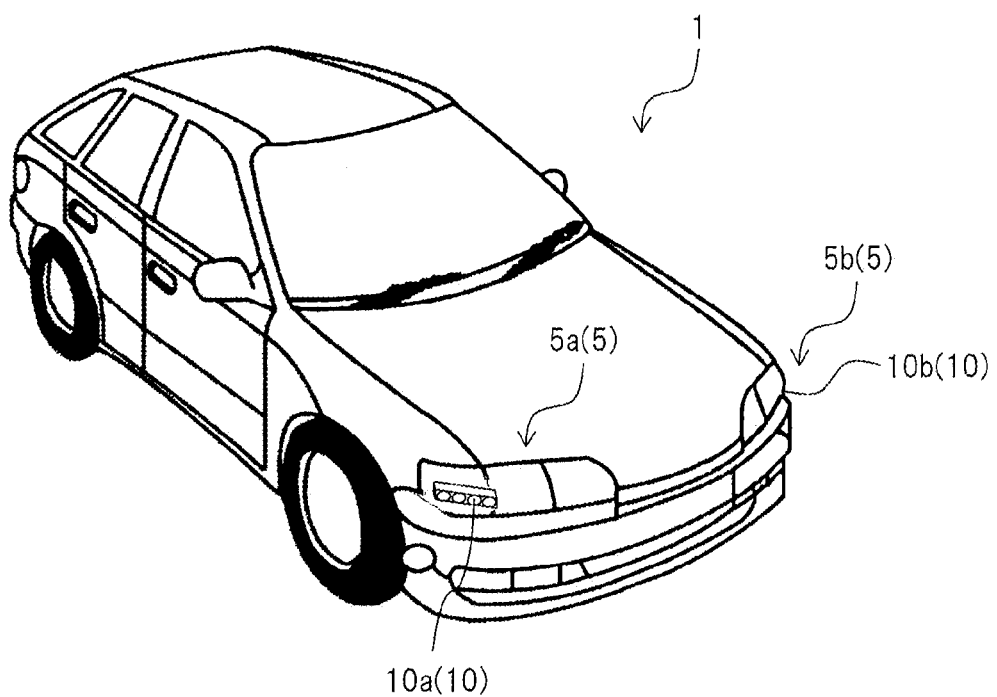
FIG. 1A is a diagram showing one example of an arrangement state of a road sign projector according to a first embodiment of the present invention.
Figure 1B:
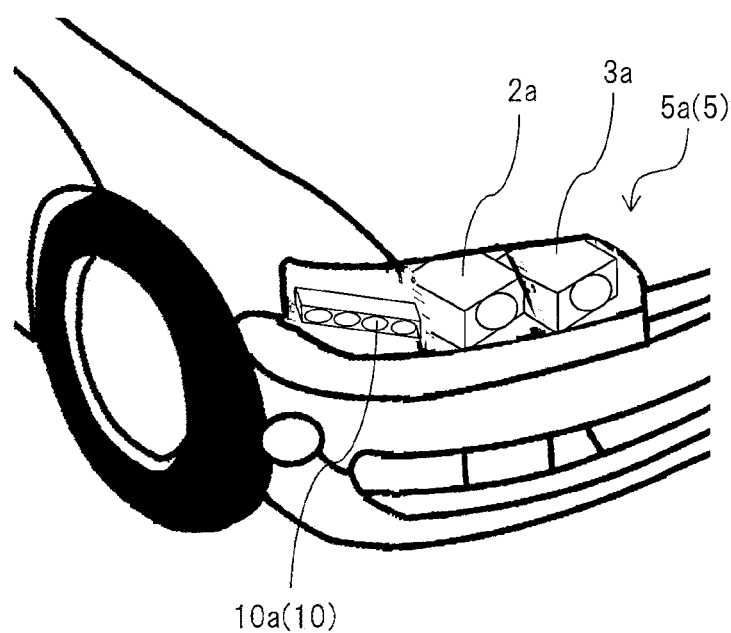
FIG. 1B is a diagram showing one example of the arrangement state of the road sign projector according to the first embodiment of the present invention.

FIGS. 1A and 1B are diagrams each showing one example of an arrangement state of a road sign projector according to a first embodiment of the present invention. FIG. 1A is a perspective view showing appearance of a car on which the road sign projector is arranged, and FIG. 1B is an enlarged view in vicinity of an illumination unit of the car. As shown in FIGS. 1A and 1B, the road sign projector 10 according to the present embodiment is arranged on, for example, the car 1.

Specifically, the road sign projector 10 is arranged on each of illumination units 5 (5a and 5b) on both ends of a front side of the car 1. Note that an enlarged view of the illumination unit 5b is not shown in FIG. 1B. However, since the illumination unit 5b is symmetrical to the illumination unit 5a with respect to a travelling direction of the car 1, the illumination unit 5a will be mainly described below. In this description, a road sign projector 10a of the illumination unit 5a is described as the road sign projector 10 in some cases as long as being not confused with a road sign projector 10b of the illumination unit 5b.

In the illumination unit 5, as shown in FIG. 1B, headlights 3a and 2a and the road sign projector 10a are arranged from center toward a peripheral portion of a front side of a car body. The headlight 3a is so-called high beam headlight, and the headlight 2a is so-called low beam headlight.

Figure 2:
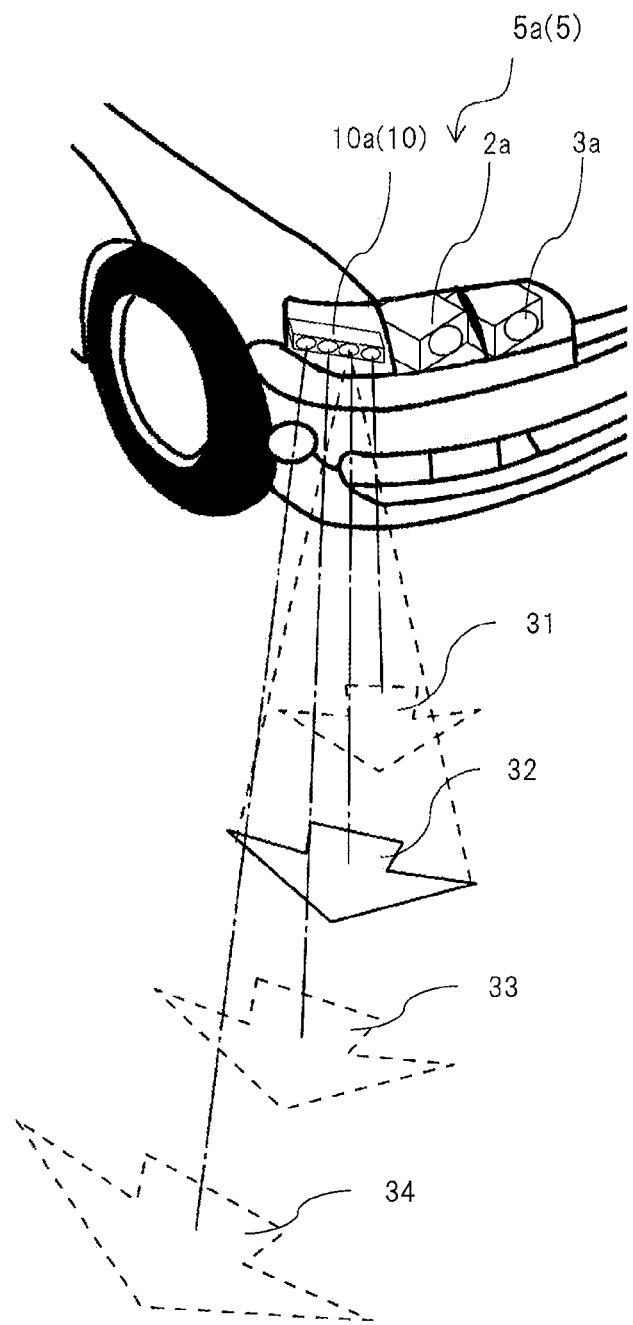
FIG. 2 is a diagram for explaining a usage state of the road sign projector according to the first embodiment of the present invention.

FIG. 2 is a diagram for explaining a usage state of the road sign projector according to the first embodiment of the present invention. As shown in FIG. 2, the road sign projector 10 displays images 31 to 34 in a plurality of regions of the road surface. Specifically, the road sign projector 10 displays arrows indicating the travelling direction of the car 1 as the images 31 to 34 onto regions on the right ahead of the travelling direction. In FIG. 2, the arrow image 32 is displayed with a solid line. However, the road sign projector 10 displays the arrow images 31 to 34 onto the road surface while sequentially switching the images. And, after the road sign projector 10 displays the arrow image 34, it repeatedly displays the arrows of the images 31 to 34.

<Configuration of Road Sign Projector>

Figure 3:
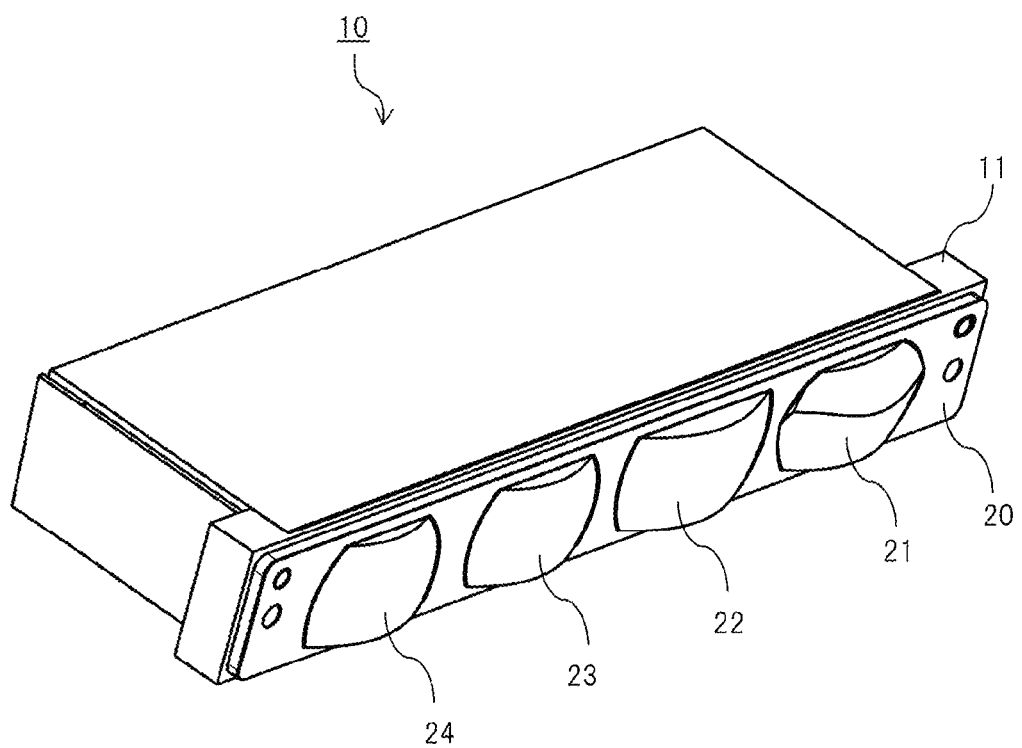
FIG. 3 is a perspective view showing appearance of the road sign projector according to the first embodiment of the present invention.
Figure 4:
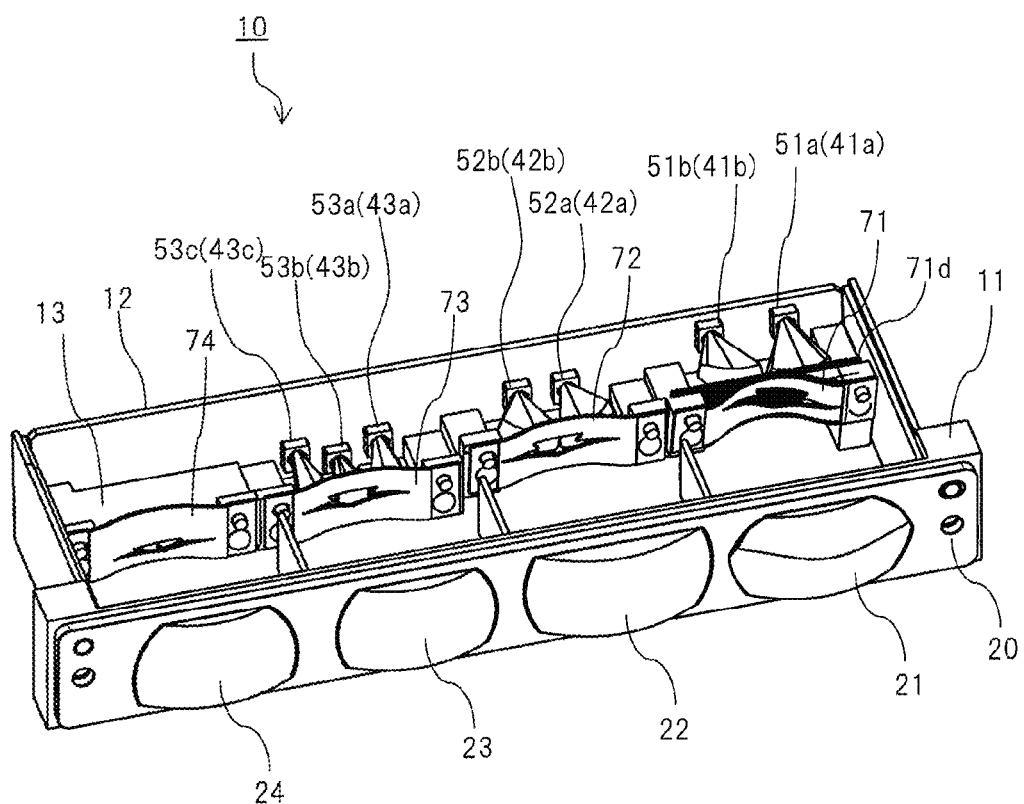
FIG. 4 is a perspective view showing one example of an inner configuration of the road sign projector according to the first embodiment of the present invention.
Figure 5A:
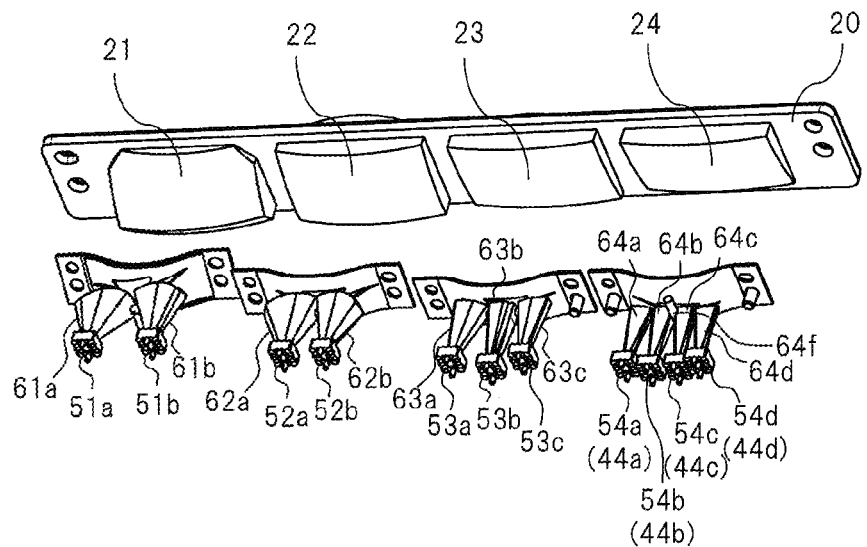
FIG. 5A is a perspective view showing one example of a configuration of a projection optical system according to the first embodiment of the present invention.
Figure 5B:
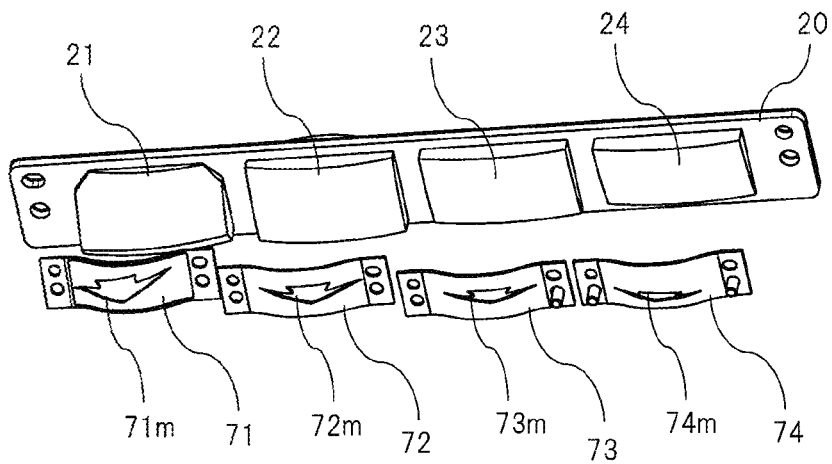
FIG. 5B is a perspective view showing one example of the configuration of the projection optical system according to the first embodiment of the present invention.
Figure 6:
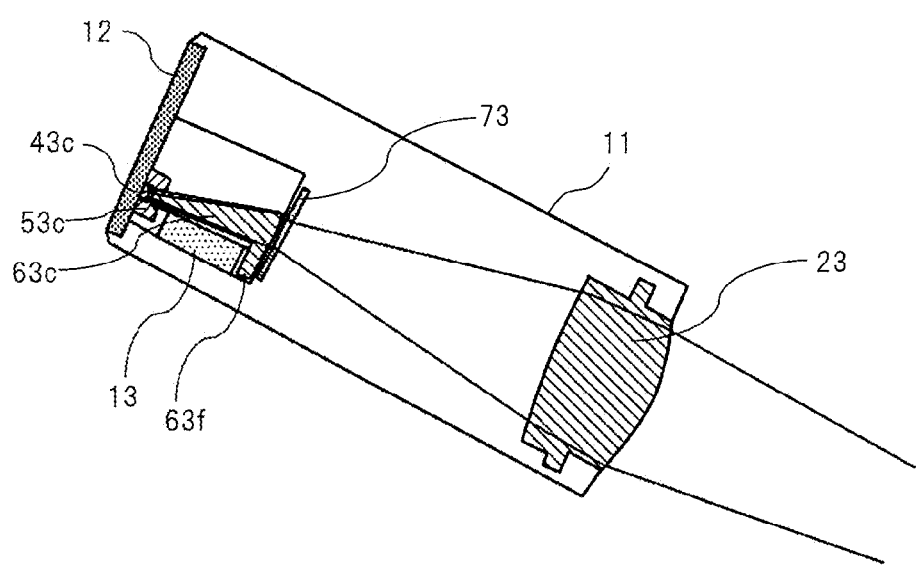
FIG. 6 is a diagram showing one example of a light path of image projection light in the projection optical system according to the first embodiment of the present invention.

FIG. 3 is a perspective view showing the appearance of the road sign projector according to the first embodiment of the present invention. FIG. 4 is a perspective view showing one example of an inner configuration of the road sign projector according to the first embodiment of the present invention. FIGS. 5A and 5B are perspective views each showing one example of a configuration of a projection optical system according to the first embodiment of the present invention. FIG. 5A shows correspondence among a solid-state light source, a shade and a projection lens, and FIG. 5B shows correspondence between the shade and the projection lens in more details. FIG. 6 is a diagram showing one example of a light path of image projection light in the projection optical system according to the first embodiment of the present invention. Note that an example of the light path in the projection optical system including the projection lens 23 is shown in FIG. 6.

As shown in FIG. 3, the road sign projector 10 includes a case 11 and a projection lens plate 20. The projection lens plate 20 is fixed at a front surface of the case 11. As shown in FIGS. 3 to 55, the projection lens plate 20 includes projection lenses 21 to 24, and is formed to be unified with these projection lenses 21 to 24. For example, the projection lens plate 20 and the projection lenses 21 to 24 are formed to be unified with each other by an injection molding method. Therefore, each of the projection lenses 21 to 24 is made of only one lens. For a material of each of the projection lens plate 20 and the projection lenses 21 to 24, for example, a resin such as acrylic resin, polycarbonate resin and polyolefin resin is suitable. A configuration of each of the projection lenses 21 to 24 will be described in detail later.

The case 11 houses each member shown in FIGS. 4 to 5B therein. Specifically, the case 11 houses solid-state light sources 41a and 41b, light guides (light guiding members) 61a and 61b, a shade 71 and others, each of which corresponds to the projection lens 21. Similarly, the case 11 houses solid-state light sources 42a and 42b, light guides 62a and 62b, a shade 72 and others, each of which corresponds to the projection lens 22. Similarly, the case 11 houses solid-state light sources 43a, 43b and 43c, light guides 63a, 63b and 63c, a shade 73 and others, each of which corresponds to the projection lens 23. Similarly, the case 11 houses solid-state light sources 44a, 44b, 44c and 44d, light guides 64a, 64b 64c and 64d, a shade 74 and others, each of which corresponds to the projection lens 24.

Among these members, the projection lens 21, the solid-state light sources 41a and 41b, the light guides 61a and 61b and the shade 71 configure the projection optical system corresponding to the region where the image 31 is displayed. Similarly, the projection lens 22, the solid-state light sources 42a and 42b, the light guides 62a and 62b and the shade 72 configure the projection optical system corresponding to the region where the image 32 is displayed. Similarly, the projection lens 23, the solid-state light sources 43a, 43b and 43c, the light guides 63a, 63b and 63c, the shade 73 configure the projection optical system corresponding to the region where the image 33 is displayed. Similarly, the projection lens 24, the solid-state light sources 44a, 44b, 44c and 44d, the light Guides 64a, 64b 64c and 64d, the shade 74 configure the projection optical system corresponding to the region where the image 34 is displayed.

In each projection optical system, as shown in FIG. 6, the image projection light emitted from the solid-state light sources is guided toward the shade by the light guides. Then, the image projection light that has been shaped by the shade is refracted toward the corresponding region by the projection lens.

Figure 7A:
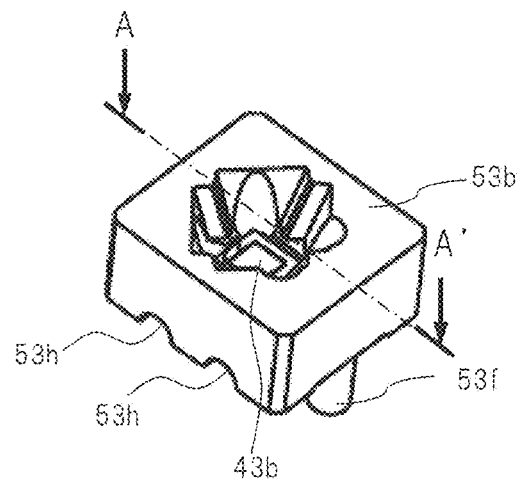
FIG. 7A is a diagram enlarging and showing vicinity of a solid-state light source according to the first embodiment of the present invention.
Figure 7B:
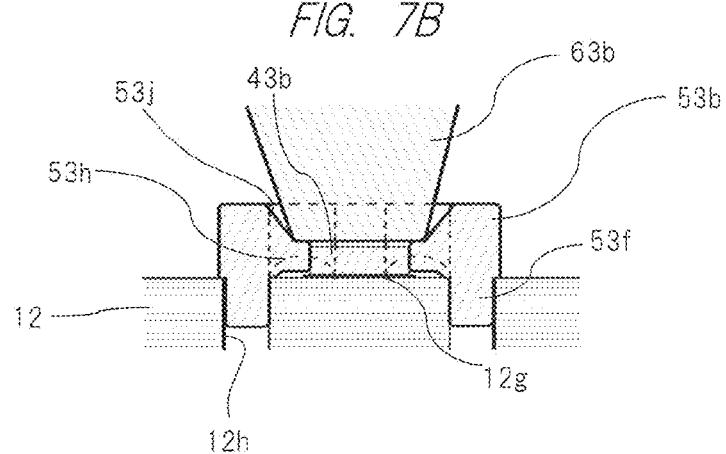
FIG. 7B is a diagram enlarging and showing the vicinity of the solid-state light source according to the first embodiment of the present invention.
Figure 7C:
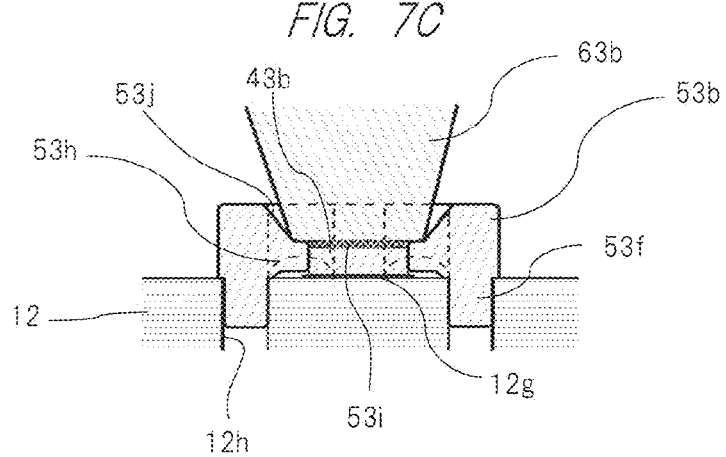
FIG. 7C is a diagram enlarging and showing the vicinity of the solid-state light source according to the first embodiment of the Present invention.

FIGS. 7A to 7C are diagrams each enlarging and showing vicinity of the solid-state light source according to the first embodiment of the present invention. FIG. 7A is a perspective view in vicinity of the solid-state light source, and FIGS. 7B and 7C are cross-sectional views on a line A-A' of FIG. 7A. In FIGS. 7A to 7C, note that the solid-state light source 43b is cited as one example. However, other different solid-state light sources from this and the peripheral portions are similarly configured.

Each of the solid-state light sources is, for example, an LED or others, and emits the image projection light for displaying the image. In the example shown in FIGS. 4 to 5B, the solid-state light sources corresponding to each optical system are arranged. However, the example is not limited to such a configuration, and the solid-state light sources may correspond to a plurality of optical systems. Further, for each optical system, only one solid-state light source may be arranged, or a plurality of solid-state light sources may be arranged as shown in FIGS. 4 to 5B. In the example shown in FIGS. 4 to 5B, two solid-state light sources are arranged for the optical systems corresponding to the regions where the images 31 and 32 near the car 1 are displayed, respectively.

As shown in FIGS. 7B and 7C, the solid-state light source is mounted on a substrate 12 through a solder layer 12g. In the manner, heat generated from the solid-state light source is released through the substrate 12.

The light guide is arranged so as to correspond to each of the solid-state light sources, and is a member that guided the image projection light emitted from the solid-state light source toward the corresponding shade. The light guide is placed so as to have an incident end arranged in vicinity of the corresponding solid-state light source, and so as to have an emitting end arranged in vicinity of the corresponding shade. The image projection light emitted into the incident end is then emitted out from the emitting end toward the shade.

The light guide is arranged close to the solid-state light source (LED), and therefore, is made of a material having transparency and heat resistance that is equal to or higher than 120° C. Therefore, for the light guide, a resin such as polycarbonate, polyolefin and silicon is suitable. The light guide is formed by, for example, an injection molding method using a mold.

FIGS. 8A and 8B are diagrams each showing a shape of the light guide and the emitted image projection light so as to correspond to each other. FIG. 8A shows a case of the present embodiment, and FIG. 8B shows a case of a comparative example. In FIGS. 8A and 8B, the projection optical system including the projection lens 23 is illustrated as one example. However, the same goes for projection optical systems including the different projection lenses 21, 22 and 24.

As shown in FIG. 8A, in the present embodiment, each emitting end of the light guides 63a to 63c has a convex surface. In the manner, a divergence angle of the image projection light emitted from each of the light guides 63a to 63c is small. Therefore, almost all the image projection light that has been emitted from each of the solid-state light sources 43a to 43c and that has passed the shade 73 reaches the projection lens 23. As described above, since each emitting end of the light guides 63a to 63c has the convex surface, the image projection light can be efficiently used.

On the other hand, in the comparative example of FIG. 8B, each emitting end of light guides 630a to 630c has a flat surface. In the manner, a divergence angle of the image projection light emitted from each of the light guides 630a to 630c is large, and the image projection light is widened. Therefore, the image projection light cannot be efficiently used. In the manner, the projected image is dark because of lack of light quantity.

In the present embodiment, a plurality of light guides are connected to one another. For example, in the example shown in FIG. 5A, the light guides arranged in the same projection optical system are connected to one another. Specifically, the light guides 61a and 61b corresponding to the solid-state light sources 41a and 41b are connected to each other. And, the light guides 62a and 62b corresponding to the solid-state light sources 42a and 42b are connected to each other. The light guides 63a, 63b and 63c corresponding to the solid-state light sources 43a, 43b and 43c are connected to one another. The light guides 64a, 64b, 64c and 64d corresponding to the solid-state light sources 44a, 44b, 44c and 44d are connected to one another.

In addition to these connection examples, light guides in adjacent projection optical systems may be connected to one another. The plurality of connected light guides are also formed to be unified by an injection mold method using a mold.

In the light guide, for example, a light guide fixing portion such as a light guide fixing portion 64f shown in FIG. 5 or a light guide fixing portion 63f shown in FIG. 6 is arranged. Below the light guide, a light guide supporting member 13 for supporting the light guide is arranged. Each light guide fixing portion is fitted with a groove formed in the light guide supporting member 13, so that the light guide is fixed to the light guide supporting member 13. The light guide fixing portion is also formed to be unified with the corresponding light guide by an injection molding method.

As shown in FIGS. 7B and 7C, the incident end of the light guide is in contact with a fixing tool (light-guiding-member fixing tool) 53b. Each light guide is positioned by the corresponding to the fixing tool.

The fixing tool is a member that is arranged so as to correspond to each solid-state light source to position the light guide. As shown in FIGS. 7A to 7C, the fixing tool (such as 53b) is fitted with the corresponding solid-state light source 43b. The fixing tool 53 has a taper portion 53j. The taper portion 53j is fitted in line contact with the incident end of the corresponding light guide 63b. In the manner, the light guide 63b and the solid-state light source 43b are relatively positioned to each other.

As shown in FIGS. 7B and 7C, the fixing tool 53b has the convex Portion 53f, and the convex portion 53f is fitted with a positioning hole 12h arranged in the substrate 12. In the manner, the fixing tool 53b is fixed at a predetermined position of the substrate 12.

As shown in FIGS. 7A to 7C, each fixing tool has an air inflow hole (such as 53h). There are a plurality of air inflow holes 53h of the fixing tool 53b shown in FIGS. 7A to 7C. However, the number of this is not limited to the plural number, and may be only one. The air inflow holes 53h communicate with a space close to the corresponding light guide 63b to release heat of the corresponding solid-state light source 43b toward the space close to the corresponding light guide 63b due to convection flow. Therefore, heat generated in the solid-state light source 43b is released toward the substrate 12 and the space close to the corresponding light guide 63b.

Each fixing tool is in direct contact with the corresponding solid-state light source, and therefore, is made of a heat-resistance resin having heat resistance that is equal to or higher than 150° C. As a material of the fixing tool, for example, silicon resin is preferable. The silicon resin has heat resistance and such formability as being suitable for mass production.

As shown in, for example, FIGS. 7B and 7C, in vicinity of each fixing tool, a gap is formed between the solid-state light source 43b and the corresponding light guide 63b. A distance of this gap is, for example, about 0.1 to 0.2 mm. However, the distance can be adjusted to an appropriate value on the basis of a shape of the fixing tool 53b. Note that this gap may be filled with a heat-resistance transparent member 53i made of, for example, silicon resin as shown in FIG. 7G. In the manner, the image projection light emitted from the solid-state light source can be efficiently guided toward the light guide.

The shades 71 to 74 are members that shape the image projection light emitted from the solid-state light sources so as to have predetermined shapes corresponding to the images 31 to 34 for the respective regions. As shown in FIG. 5B, in the shades 71 to 74, openings 71m to 74m are formed, respectively. The shapes of the openings 71m to 74m correspond to the above-described arrows indicating the travelling direction of the car. Specifically, the shapes of the openings 71m to 74m are defined in consideration of characteristics of the corresponding projection lenses 21 to 24. The image projection light emitted from the light guides is shielded to form the arrow shapes by the openings 71m to 74m of the corresponding shades 71 to 74, and reach the projection lenses 21 to 24.

A region of each of the shades 71 to 74 from a center portion to a circumferential portion curves toward each of the corresponding projection lenses 21 to 24. In the example of FIG. 8A, ends of the shade 73 in vicinity of the light guides 63a and 63c are curved toward the projection lens 23 as compared with the center of the same in vicinity of the light guide 63b.

As described later, each of the projection lenses 21 to 24 is formed of one lens made of resin. Therefore, curvature of field of each projection lens is large. Thus, when the shade is formed to have a flat surface, the image is defocused at a peripheral portion, and therefore, clear image cannot be displayed in some cases. Accordingly, as shown in FIG. 8A, the ends of the shade are curved toward the projection lens, so that a curvature equivalent to the curvature of field can be provided to the shade. In the manner, the clear image can be displayed.

Figure 9A:
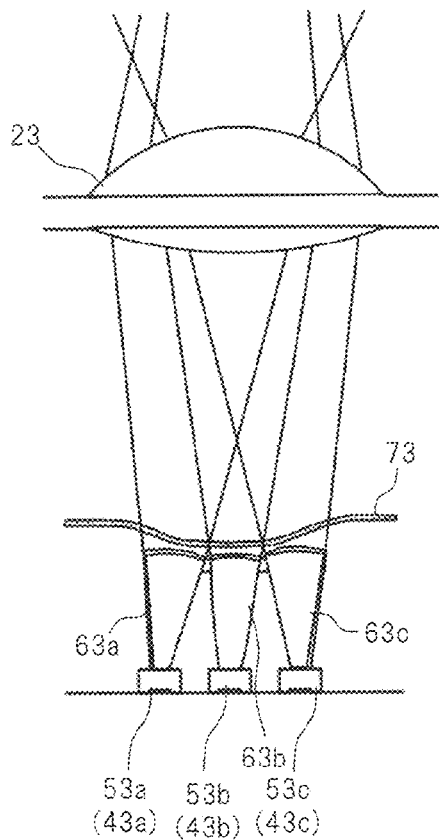
FIG. 9A is a diagram showing a projection optical system and a displayed image in comparison.
Figure 9B:
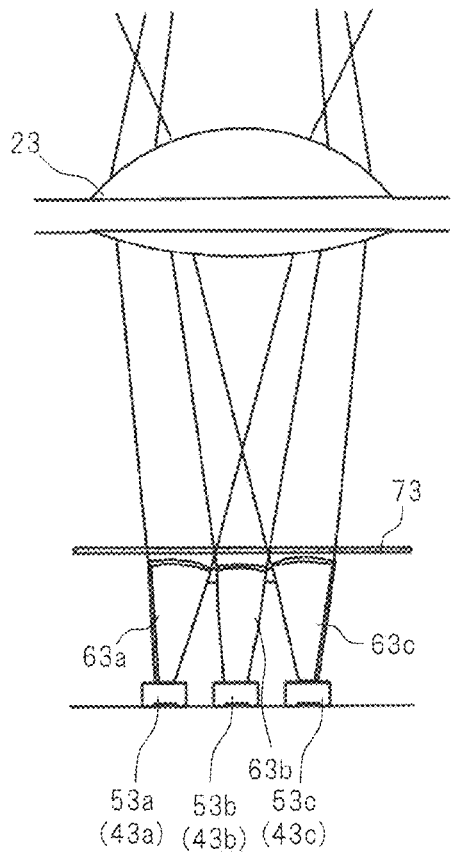
FIG. 9B is a diagram showing a projection optical system and a displayed image in comparison.

The shades 71 to 74 shown in FIGS. 4 to 5B are arranged so as to correspond to the respective regions where the image 31 to 34 are displayed, and are independent from one another. However, if the openings 71m to 74m are formed, configurations of the shades are not limited to such a configuration, and the shades 71 to 74 may be formed to be unified FIGS. 9A and 9B are diagrams each showing the projection optical system and the displayed image in comparison. FIG. 9A shows the projection optical system having the shade formed in the curved shape and the displayed image, and FIG. 9B shows the projection optical system having the shade formed in the flat shape and the displayed image.

When the shade is curved as shown in FIG. 9A, a clear image is displayed. On the other hand, when the shade is flattened as shown in FIG. 9B, an image having a peripheral portion that is slightly unclear in comparison with FIG. 9A is displayed. However, even in the case of FIG. 9B, influence on visibility of the image is small.

The projection lenses 21 to 24 correspond to the respective regions where the images are displayed, and project the images onto the corresponding regions. For example, the projection lens 21 corresponds to the region where the image 31 is displayed, and projects the image 31. Similarly, the projection lenses 22 to 24 correspond to the regions where the images 32 to 34 are displayed, and project the images 32 to 34, respectively. In other words, the projection lens 21 corresponds to the region that is the nearest to the car 1, and the projection lenses 22 to 24 corresponds to the regions that are sequentially far away from the car 1, respectively.

The projection lenses 21 to 24 are different from one another at least in one of a focal length and axial inclination. For example, the projection lens 21 projects the image 31 onto the region near the car 1, and therefore, has the shortest focal length. And, the farther from the car 1 the region is, the longer the focal length of the corresponding projection lens is. In the manner, the positions at which the images are projected are different from one another, and therefore, the focal lengths of the projection lenses 21 to 24 are different from one another.

At the same time, incident angles of the images on the road surface are different from one another, and therefore, axial inclinations of the projection lenses 21 to 24 are correspondingly different from one another.

FIGS. 4 to 5B show that the image projection light in all the projection optical systems is emitted in almost the same direction as one another. For example, the emitting direction of the image projection light may be different depending on the projection optical system. In this case, the axial inclinations of the plurality of projection lenses are corresponded to the directions. However, as long as quality of the projected image on the road surface is allowed, the inclinations of the lenses may be equal to one another. In FIGS. 4 to 5B, the projection lenses 21 to 24 are arranged to be lined on a horizontal line. However, the arrangement is not limited to such configuration. Therefore, depending on the arrangement of the projection lenses, the focal length of the plurality of projection lenses may be equal to one another.

Figure 10:
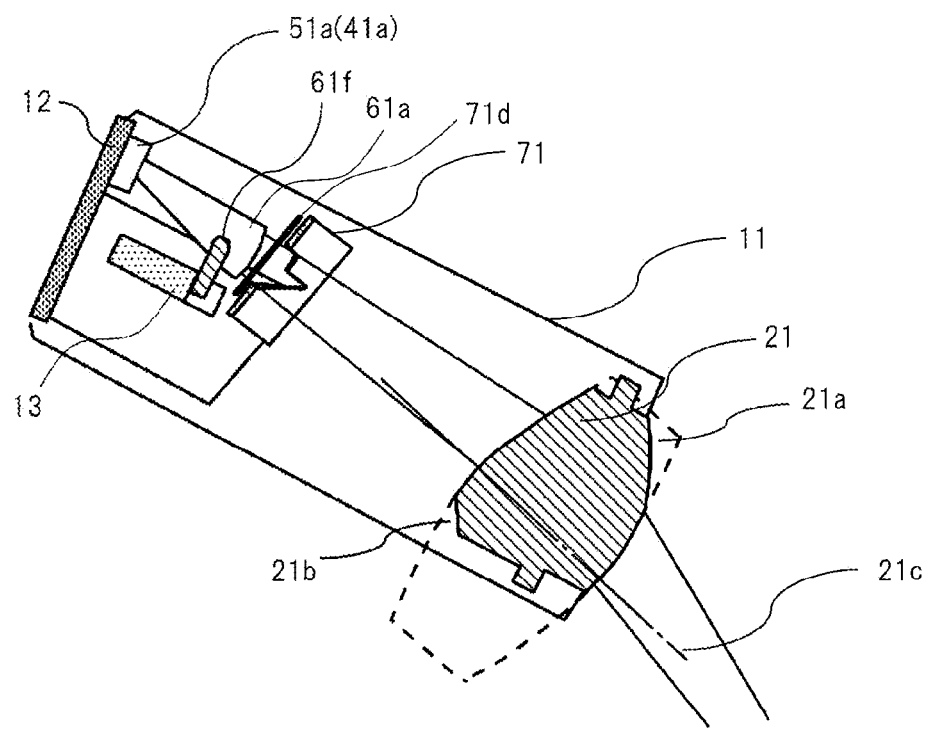
FIG. 10 is a diagram showing another example of the light path of the image projection light in the projection optical system according to the first embodiment of the present invention.

FIG. 10 is a diagram showing another example of the light path of the image projection light in the projection optical system according to the first embodiment of the present invention. FIG. 10 shows an example of, for example, a light path in a projection optical system including the projection lens 21.

The projection optical system including the projection lenses 22 to 24 has, for example, a configuration as shown in FIG. 6. On the other hand, in the projection optical system including the projection lens 21, the image is to be displayed on the nearest region to the car 1, and therefore, it is necessary to bend the emitted image projection light toward a portion immediately below a right front side of the car 1.

Accordingly, as shown in FIG. 10, in the projection lens 21, an incident range of the image projection light is offset upward with respect to a center axis 21 of the lens. The projection lens 21 is inclined downward with respect to a reference axis of the case 11 (such as a center axis of each of the projection lenses 22 to 24). Because of such configuration, a refraction angle of the projection lens 21 is large.

However, in this configuration, the projection lens 21 is larger than other projection lenses 22 to 24, and the projection lens 21 is inclined downward, and therefore, the projection lens 21 cannot be housed in the case 11. Accordingly, in the projection lens 21 in the present embodiment, cut-out portions 21a and 21b are formed so that portions not housed in the case 11 are removed.

Specifically, an upper side of a front surface of the projection lens 21 is removed to form the cut-out portion 21a. And, a lower side of the projection lens 21 is removed to form the cut-out portion 21b. Note that the cut-out portions 21a and 21b are portions through which the image projection light does not pass, as shown in FIG. 10.

As shown in FIG. 5B, note that the opening 71m of the shade corresponding to the arrow shape projected by the projection lens 21 is larger in a longitudinal size than other openings 72m, 73m and 74m. This is because the incident angle of the image light projected on the road surface by using the projection lens 21 is smaller than the incident angles of the image light caused by using other projection lenses, which results in a smaller magnification power in the longitudinal direction of the image light projected on the road surface.

Since the longitudinal size is larger, an angle of view relative to the projection lens is larger, and therefore, it is difficult to uniformly maintain brightness of the whole projection image. As a countermeasure, in order to improve the uniformity of the projection image in only this optical system, a diffuser plate 71d is provided between the light guiding body 61a and the shade 71.

Note that the example of the formation of the cut-out portions in only the projection lens 21 has been described here. However, the cut-out portion may be also formed in other projection lenses 22 to 24 if needed. In the manner, in the present embodiment, at least one projection lens has the cut-out portion.

Main Effect According to Present Embodiment

According to the present embodiment, the road sign projector 10 has the shade and projection lens corresponding to each of the regions. According to this configuration, the image is formed by the shade, and therefore, a projector with a liquid crystal display device is unnecessary. In the manner, the road sign projector can also operate at the assumed usage temperature of the car, so that the power consumption and the apparatus cost can be reduced.

Since each image for each region is projected by the corresponding dedicated projection lens, aberration of each of the projection lenses 21 to 24 can be optimally designed. In the manner, each of the projection lenses 21 to 24 can be made of one lens, and therefore, the apparatus cost can be reduced.

According to the present embodiment, the projection lenses 21 to 24 are different from one another in at least one of the focal length and the axial inclination. According to this configuration, the direction in which the image projection light is bent can vary for each projection optical system, and therefore, the region where the image is displayed can be freely set.

According to the present embodiment, the emitting end of the light guide has the convex surface. According to this configuration, a divergence angle of the image projection light emitted from the light guide is small, and therefore, the image projection light can be efficiently used. In the manner, while the light quantity of the image projection light is suppressed, the image with the equivalent brightness can be displayed.

According to the present embodiment, the plurality of light guides are connected. According to this configuration, the light guides can be easily handled, and besides, the plurality of light guides can be collectively formed, and therefore, the productivity of the light guides can be improved.

According to the present embodiment, the gap between the solid-state light source and the corresponding light guide is filled with the heat-resistance transparent member. According to this configuration, the image projection light emitted from the solid-state light source can be efficiently guided toward the light guide.

According to the present embodiment, at least one of the projection lenses has the cut-out portion. According to this configuration, even if a large lens is used, the portion through which the image projection light does not pass can be removed, and therefore, the region where the image can be displayed can be more enlarged. In the manner, since the portion that cannot be housed in the case 11 can be removed, the increase in the size of the case 11 can be suppressed. In the manner, the increase in the size of the road sign projector 10 can be suppressed, and the number of options for the setting position can be increased.

According to the present embodiment, the shade corresponding to each region is arranged. According to this configuration, since the shade can be downsized, the degree of freedom of the design in the projection optical system can be improved.

According to the present embodiment, the region of the shade from the center portion to the circumferential portion curves toward the corresponding projection lens. According to this configuration, the curvature equivalent to the curvature of field of the projection lens can be provided to the shade, so that the clear image can be displayed.

According to the present embodiment, each fixing tool has the air inflow hole. According to this configuration, the air inflow hole communicates with the light guide, and therefore, heat of the solid-state light source can be released by convection flow. In the manner, the heat release performance is improved, and therefore, deterioration of the solid-state light source can be suppressed, and life of the apparatus can be extended.

Second Embodiment

Next, a second embodiment will be described. In the present embodiment, a vehicle lamp having the road sign projector according to the first embodiment will be described. In the vehicle lamp according to the present embodiment, an image displayed on the road surface and the displayed directional indicator are corresponded to each other. Note that the detailed explanation for the described parts overlapped with those of the above-described embodiment will be omitted in principle below.

<Arrangement State of Vehicle Lamp>

Figure 11A:
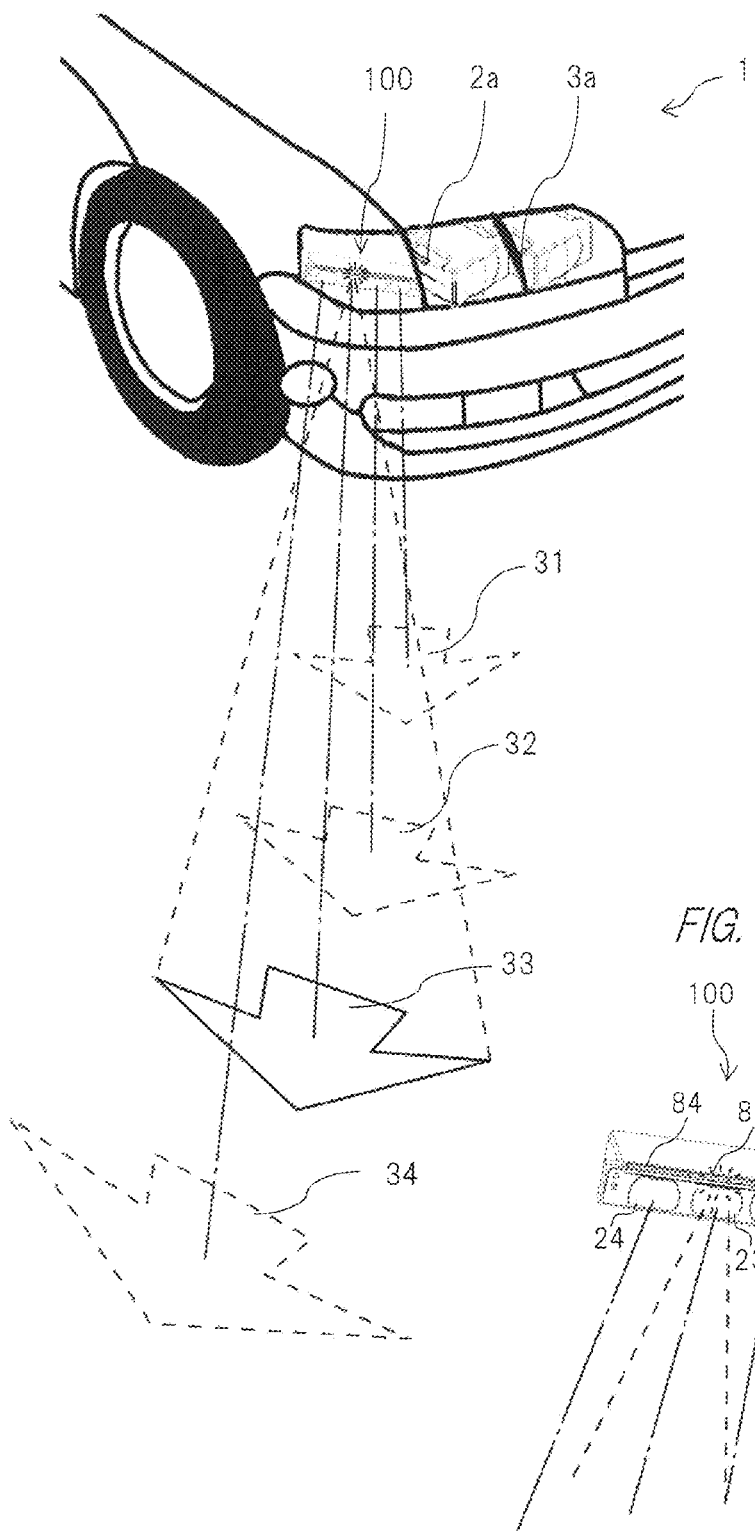
FIG. 11A is a diagram for explaining a usage state of a vehicle lamp according to a second embodiment of the present invention.
Figure 11B:
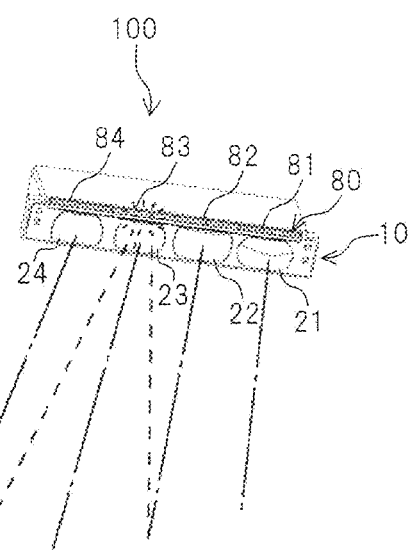
FIG. 11B is a diagram for explaining the usage state of the vehicle lamp according to the second embodiment of the present invention.

FIGS. 11A and 11B are diagrams each for explaining a usage state of the vehicle lamp according to the second embodiment of the present invention. FIG. 11A shows a state of display of the image corresponding to each region of the road surface, and FIG. 11B shows the image projection and the directional-indicator display so as to correspond to each other.

As similar to the first embodiment, a vehicle lamp 100 is arranged on, for example, a car 1 as shown in FIG. 11A. As shown in FIG. 11B, the vehicle lamp 100 has a road sign projector 10 and a directional indicator 80. As similar to FIG. 2, the road sign projector 10 of the vehicle lamp 100 displays, for example, arrow images 31 to 34 onto a plurality of regions of the road surface as shown in FIG. 11A.

FIG. 11A shows a case of display of the arrow image 33. In the directional indicator 80 in this case, a directional-indicator display unit 83 corresponding to the image 33 displays the directional indicator as shown in FIG. 11B.

The road sign projector 10 displays the arrow images 31 to 34 onto the road surface while sequentially switching the images. Also in the directional indicator 80, directional-indicator display units 81 to 84 corresponding to the images 31 to 34 display the corresponding directional indicators while sequentially switching the directional indicators. Therefore, the directional indicator 80 can perform sequence display of the directional indicators in synchronization with the images 31 to 34.

<Configuration of Vehicle Lamp>

Figure 12:
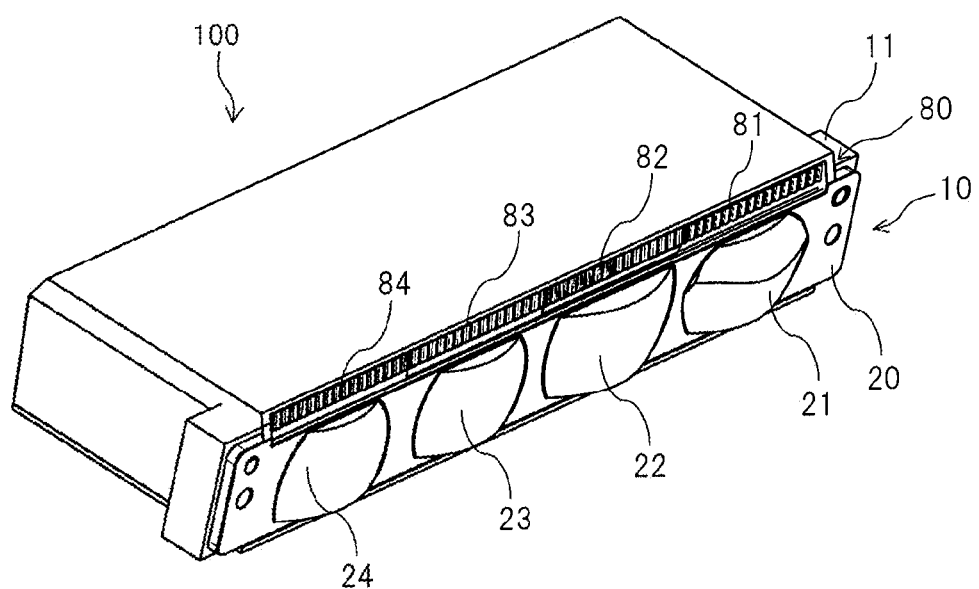
FIG. 12 is a perspective view showing appearance of the vehicle lamp according to the second embodiment of the present invention.
Figure 13:
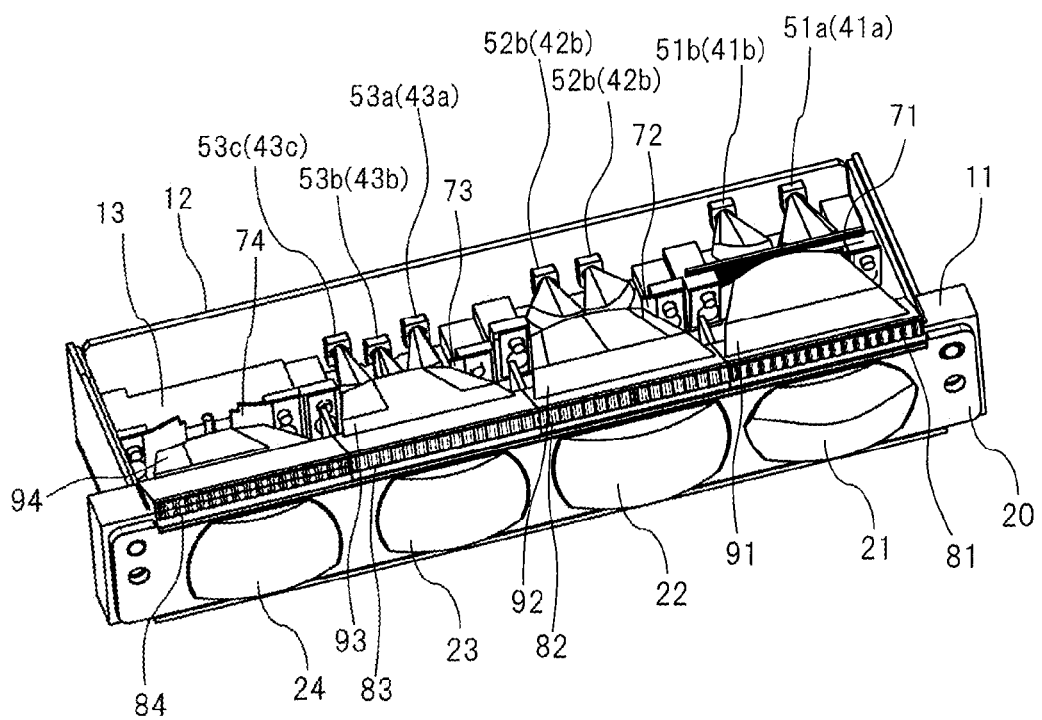
FIG. 13 is a perspective view showing one example of an inner configuration of the vehicle lamp according to the second embodiment of the present invention.
Figure 14A:
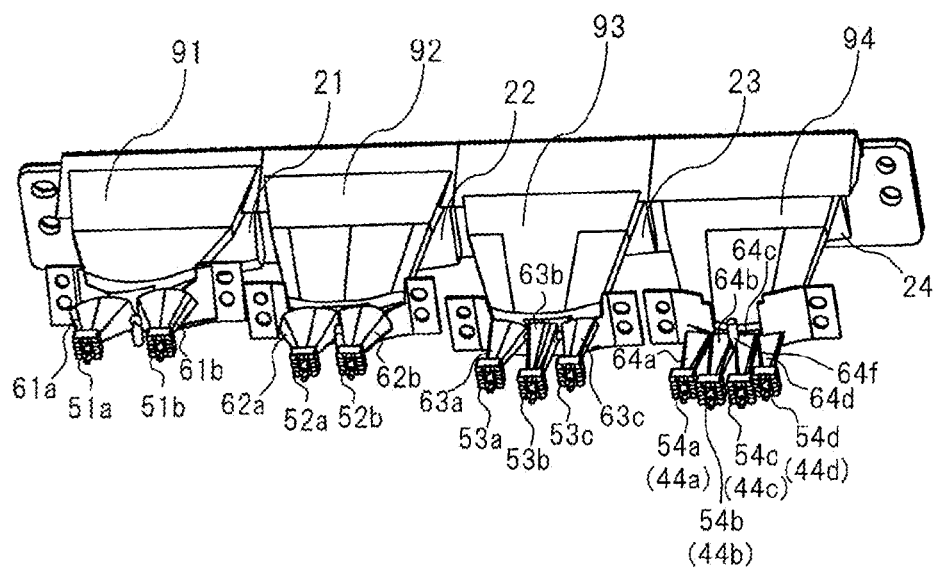
FIG. 14A is a perspective view showing one example of configurations of a projection optical system and a directional-indicator optical system according to the second embodiment of the present invention.
Figure 14B:
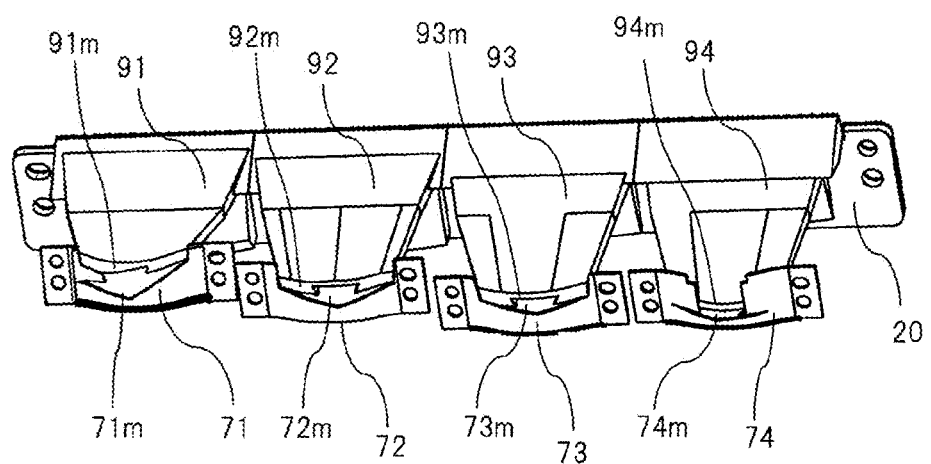
FIG. 14B is a perspective view showing one example of configurations of the projection optical system and the directional-indicator optical system according to the second embodiment of the present invention.
Figure 15:
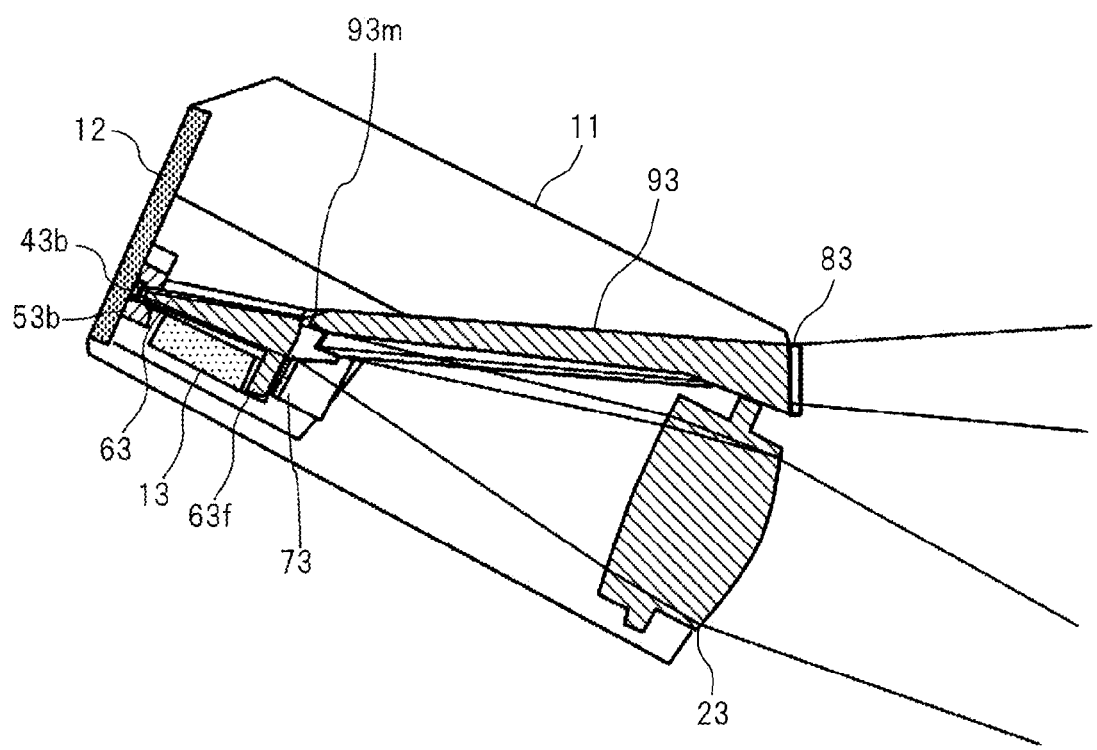
FIG. 15 is a diagram showing one example of a light path of image projection light in the projection optical system and the directional-indicator optical system according to the second embodiment of the present invention.

FIG. 12 is a perspective view showing appearance of the vehicle lamp according to the second embodiment of the present invention. FIG. 13 is a perspective view showing one example of an inner configuration of the vehicle lamp according to the second embodiment of the present invention. FIGS. 14A and 14B are perspective views each showing one example of configurations of a projection optical system and a directional-indicator display optical system according to the second embodiment of the present invention. FIG. 14A shows correspondences among a solid-state light source, a shade, a projection lens and a light guide for the directional indicator, and FIG. 14B shows the correspondence between the shade and the light guide for the directional indicator in more detail. FIG. 15 is a diagram showing one example of a light path of image projection light in the projection optical system and the directional-indicator display optical system according to the second embodiment of the present invention. Note that FIG. 15 shows an example of a light path of the projection optical system including the projection optical lens 23 and a light path of the directional-indicator display optical system including the directional-indicator display unit 83. Note that explanation for the road sign projector 10 will be omitted because of being already made in detail in the first embodiment.

The directional indicator 80 is a device that displays the directional indicator notifying the trailing cars, pedestrians, etc., of the traveling direction of the car 1 at the time of turning right or left. As shown in FIGS. 12 and 13, the directional indicator 80 has the directional-indicator display units 81 to 84. As shown in FIGS. 13 to 14B, the directional indicator 80 has light guides 94 to 94 for the directional-indicator display (light-guiding members for the directional-indicator display).

The directional-indicator display units 81 to 84 are members that display the directional indicators. The directional-indicator display units 81 to 84 are arranged in, for example, vicinity of an upper end of a lens plate 20. Specifically, the directional-indicator display units 81 to 84 are arranged in vicinity of the corresponding projection lenses 21 to 24, respectively. Each of the directional-indicator display units 81 to 84 has, for example, a rectangular shape extending in an arrangement direction of the projection lenses 21 to 24, which is an elongate shape along the lens plate 20.

The directional-indicator display units 81 to 84 correspond to the regions where the images are displayed, respectively. Specifically, the directional-indicator display unit 81 corresponds to the region where the image 31 is displayed. The directional-indicator display unit 82 corresponds to the region where the image 32 is displayed. The directional-indicator display unit 83 corresponds to the region where the image 33 is displayed. The directional-indicator display unit 84 corresponds to the region where the image 34 is displayed.

The directional-indicator display units 81 to 84 display the directional indicators when the images 31 to 34 are displayed on the corresponding regions. That is, the vehicle lamp 100 can perform the image display on the road surface and the display of the directional indicator at the same time.

In each of the directional-indicator display units 81 to 84, a predetermined diffusion pattern is formed. The directional-indicator display units 81 to 84 display the directional indicators with predetermined light-distribution patterns by diffusing the light for the directional-indicator display on the basis of the diffusion patterns.

The light guides 91 to 94 for the directional-indicator display are arranged for the directional-indicator display units 81 to 84, respectively. The light guides 91 to 94 for the directional-indicator display guide the image projection light toward the corresponding directional-indicator display units 81 to 84. That is, the image projection light emitted from the solid-state light source is used for the image projection and also used as the light for the directional-indicator display. In other words, the solid-state light source is a light source that is used in common between the image projection and the directional-indicator display.

As shown in FIG. 15, an incident end of the light guide (such as 93) for the directional-indicator display is arranged in vicinity of an emitting end of the corresponding light guide (such as 63). That is, the light guide for the directional-indicator display is arranged in front of the corresponding light guide. Specifically, the incident end of the light guide for the directional-indicator display is arranged in an upper portion of the corresponding light guide. In the manner, as shown in FIG. 15, a component of the image projection light emitted from the upper portion of the light guide is used for the directional-indicator display, and other component of the image projection light is used for the image projection.

Each of the light guides 91 to 94 for the directional-indicator display is isolated from the solid-state light source. A light intensity of the light for the directional-indicator display is not larger than that of the light used for the image projection. Therefore, a material of each of the light guides 91 to 94 for the directional-indicator display may be the same material as that of the light guide, or may be a resin such as acrylic resin having lower heat resistance than that of the light guide.

As shown in FIGS. 14B and 15, each of the shades has an opening corresponding to the incident end of each light guide for the directional-indicator display. This opening is formed so as to allow the light for the light guide display emitted from the emitting end of the light guide to enter the corresponding light guide for the directional-indicator display.

Specifically, an opening 91*m* corresponds to the light guide 91 for the directional-indicator display. An opening 92*m* corresponds to the light guide 92 for the directional-indicator display. An opening 93*m* corresponds to the light guide 93 for the directional-indicator display. An opening 94*m* corresponds to the light guide 94 for the directional-indicator display.

Main Effect According to Present Embodiment

According to the present embodiment, in addition to each effect according to the first embodiment, the following effect can be obtained. According to the present embodiment, the vehicle lamp 1 has the road sign projector and the directional indicator, and the directional-indicator display unit displays the directional indicator when the image is displayed in the corresponding region.

According to this configuration, the image projection and the directional indicator are displayed on the road surface at the same time, and therefore, it is easier to notify them of the traveling direction of the car 1.

According to the present embodiment, the road sign projector has the light guide for the directional-indicator display that guides the image projection light toward the corresponding directional-indicator display unit. The incident end of the light guide for the directional-indicator display is arranged in vicinity of the emitting end of the corresponding light guide. The shade has the opening corresponding to the incident end of the light guide for the directional-indicator display. According to this configuration, the image projection light can be also used as the light for the directional-indicator display. In the manner, the solid-state light source can be used in common, and therefore, the power consumption and the apparatus cost can be reduced.

Third Embodiment

Next, a third embodiment will be described. In the first and second embodiments, the road sign projector, etc., having the projection optical system configured for each region where the image is displayed has been described (see FIGS. 1, 11 and others). If the arrangement space for the road sign projector, etc., is sufficiently secured in the illumination unit 5 (5*a*, 5*b*), problems do not particularly arise in the arrangement. However, depending on a mode of the car, the arrangement space cannot be sufficiently secured in some cases. Accordingly, in the present embodiment, a road sign projector that can be handled even in a small arrangement space will be described.

Figure 16:
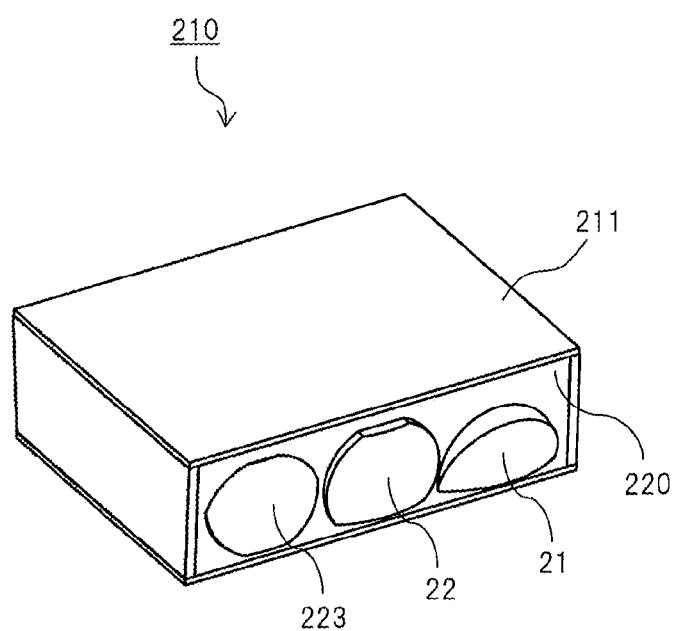
FIG. 16 is a perspective view showing appearance of a road sign projector according to a third embodiment of the present invention.
Figure 17:
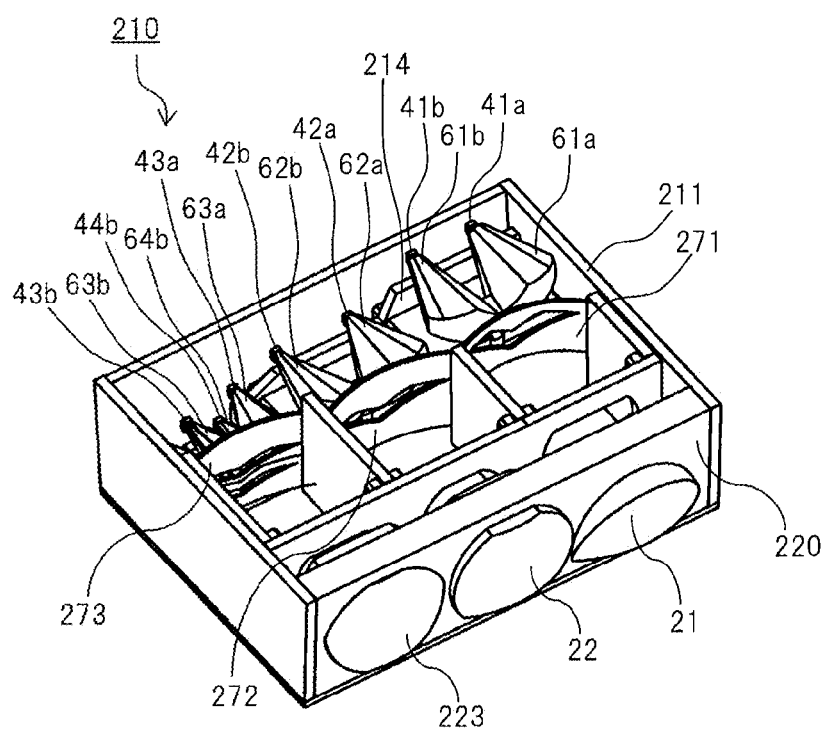
FIG. 17 is a perspective view showing one example of an inner configuration of the road sign projector according to the third embodiment of the present invention.
Figure 18A:
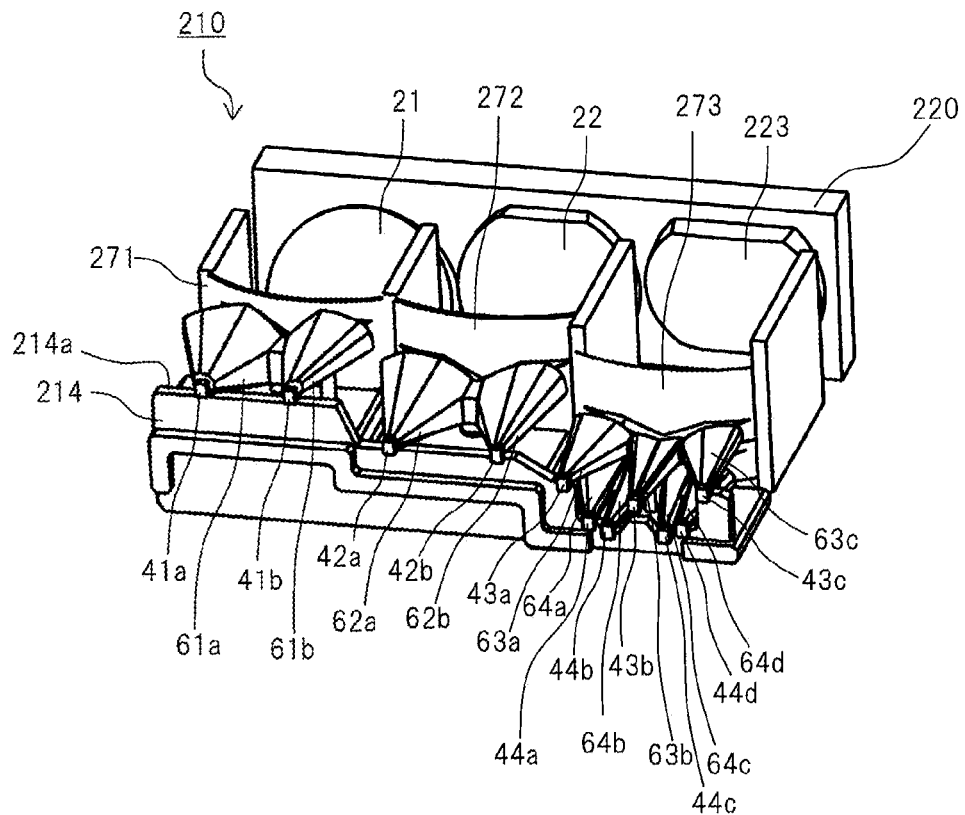
FIG. 18A is a perspective view showing one example of a configuration of a projection optical system according to the third embodiment of the present invention.
Figure 18B:
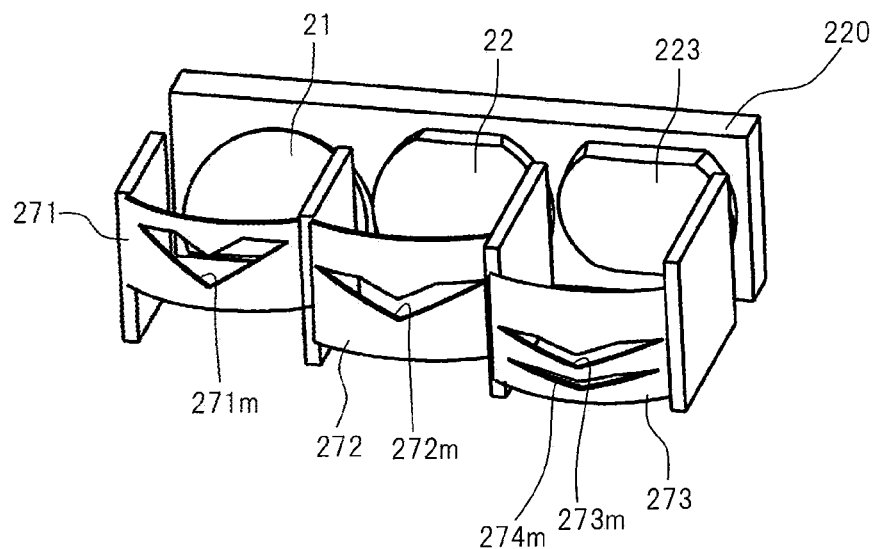
FIG. 18B is a perspective view showing one example of the configuration of the projection optical system according to the third embodiment of the present invention.

FIG. 16 is a perspective view showing appearance of the road sign projector according to the third embodiment of the present invention. FIG. 17 is a perspective view showing one example of an inner configuration of the road sign projector according to the third embodiment of the present invention. FIGS. 18A and 18B are perspective views each showing one example of a configuration of a projection optical system according to the third embodiment of the present invention. FIG. 18A shows correspondence among a solid-state light source, a shade and a projection lens, and FIG. 18B shows correspondence between the shade and the projection lens in more detail.

As shown in FIG. 16, a road sign projector 210 has a case 211 and a projection lens plate 220. The projection lens plate 220 is fixed to a front surface of the case 211. As shown in FIGS. 16 to 18B, the projection lens plate 220 has projection lenses 21, 22 and 223, and is formed to be unified with these projection lenses 21, 22 and 223. The projection lens plate 220 and the projection lenses 21, 22 and 223 are formed to be unified with each other by, for example, an injection molding method as similar to the above-described embodiments. Therefore, each of the projection lenses 21, 22 and 223 is made of only one lens. Materials of the projection lens plate 220 and the projection lenses 21, 22 and 223 are also the same as those of the above-described embodiments. A configuration of a projection optical system corresponding to each of the projection lenses 21, 22 and 223 will be described in detail later.

As shown in FIGS. 17 to 18B, the case 211 houses solid-state light sources 41a and 41b, light guides (light-guiding members) 61a and 61b, a shade 271 and others corresponding to the projection lens 21. Similarly, the case 211 houses solid-state light sources 42a and 42b, light guides 62a and 62b, a shade 272 and others corresponding to the projection lens 22. Similarly, the case 211 houses solid-state light sources 43a, 43b and 43c, light guides 63a, 63b and 63c, a shade 273 and others corresponding to the projection lens 223. Further, the case 211 houses solid-state light sources 44a, 44b, 44c and 44d, light guides 64a, 64b, 64c and 64d, a shade 273 and others corresponding to the projection lens 223.

As shown in FIGS. 17 and 18B, openings 271m and 272m are formed in the shades 271 and 272, respectively. And, openings 273m and 274m are formed in the shade 273. Each of the openings 271m to 274m shown in FIGS. 17 and 18B has a triangular shape with a cutting-out portion. However, the shape is not particularly limited as long as showing the traveling direction of the car. For example, an arrow or others shown in FIGS. 4 and 5B may be applicable.

Among the members inside the case 211, the projection lens 223, the solid-state light sources 43a, 43b and 43c, the light guides 63a, 63b and 63c, and the shade 273 (opening 273m) configure a projection optical system corresponding to, for example, the region where the image 33 of FIG. 2 is displayed. Similarly, the projection lens 223, the solid-state light sources 44a, 44b, 44c and 44d, the light guides 64a, 64b, 64c and 64d, and the shade 273 (opening 274m) configure a projection optical system corresponding to, for example, the region where the image 34 of FIG. 2 is displayed.

The projection lens 223 becomes a part of two projection optical systems, and has a function of projecting the images onto two regions at the same time. Note that the respective projection optical systems including the projection lenses 21 and 22 are provided with the shades 71 and 72 shown in FIGS. 4 to 5B and others. However, in the present embodiment, the shades are changed to the shade 271 and 272, respectively.

Figure 19:
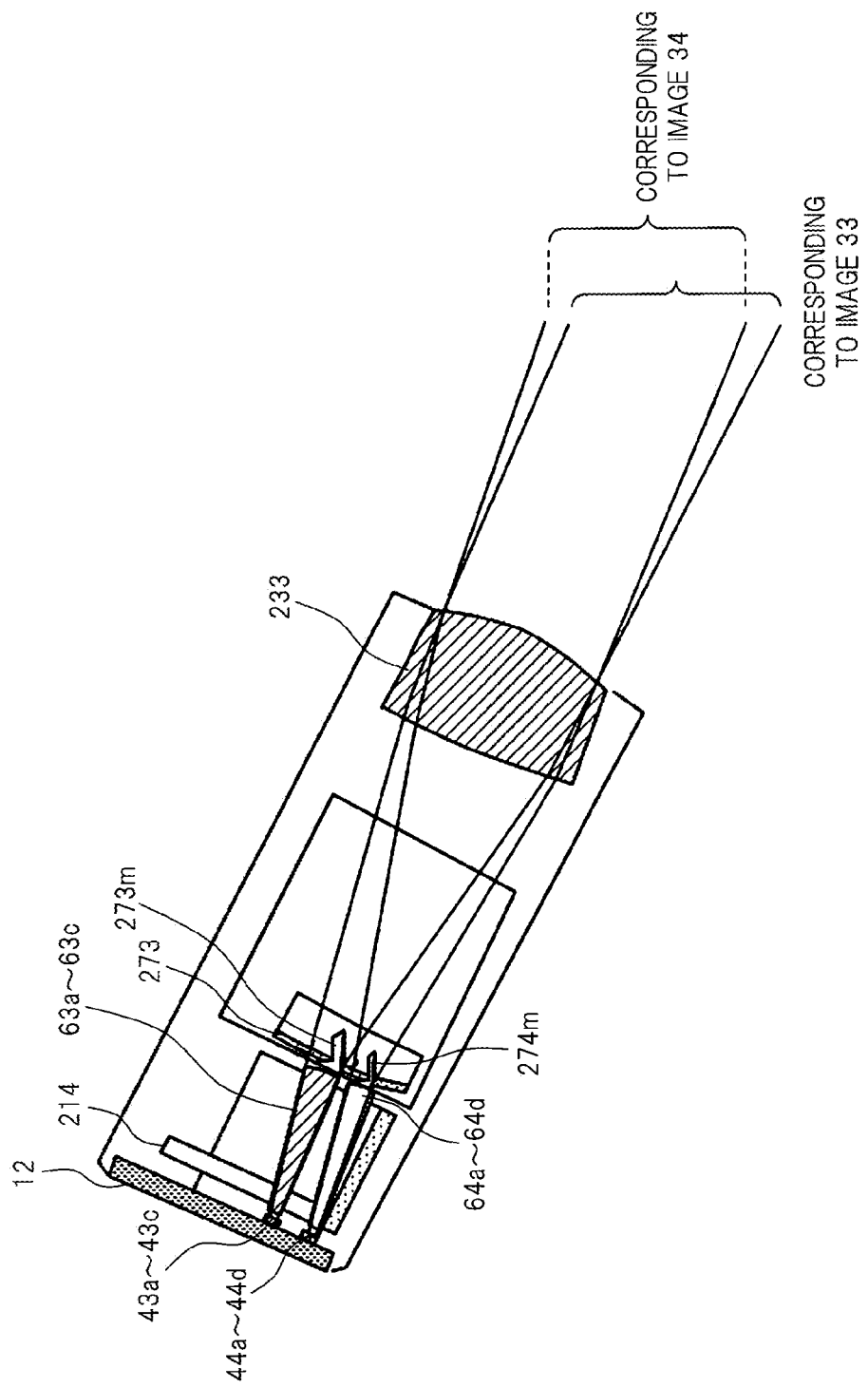
FIG. 19 is a diagram showing one example of a light path of image projection light in the projection optical system according to the third embodiment of the present invention.

FIG. 19 is a diagram showing one example of a light path of image projection light in the projection optical system according to the third embodiment of the present invention. FIG. 19 shows light paths of a plurality of projection optical systems related to the projection lens 223. As shown in FIG. 19, on an upper side, the projection optical system including the projection lens 223, the solid-state light sources 43a, 43b and 43c, the light guides 63a, 63b and 63c, the shade 273 (opening 273m) is configured. On a lower side, the projection optical system including the projection lens 223, the solid-state light sources 44a, 44b, 44c and 44d, the light guides 64a, 64b, 64c and 64d, the shade 273 (opening 274m) is configured. As described above, the plurality of projection optical systems related to the projection lens 223 are configured to be layered on the upper and lower sides.

As shown in FIG. 19, the upper projection optical system projects the image onto a region near the car (region corresponding to the image 33). On the other hand, the lower projection optical system projects the image onto a region more ahead of the car than the projected region of the upper projection optical system (region corresponding to the image 34).

In the first and second embodiments, the fixing tool is arranged so as to surround the solid-state light source, and the incident end of the light guide is arranged at the taper portion 53j of the fixing tool, so that the light guide is positioned. On the other hand, in the present embodiment, the fixing tool is not arranged. Instead of the fixing tool, a light-guide supporting member 214 that supports the incident end of the light guide is arranged inside the case 211 as shown in FIG. 18A. The incident ends of the light guides (61a to 64a or others) are placed on an end surface 214a of the light-guide supporting member 214, and are positioned with respect to the corresponding solid-state light sources. As described above, in the present embodiment, the light guides are supported by the light-guide supporting members 13 and 14. In FIG. 18A, note that the light guide 63b of the light guides 63a to 63c arranged on the upper side is not placed on the end surface 214a of the light-guide supporting member 214. However, the light guide 63b is connected to the light guides 63a and 63c on both sides, and therefore, it can be said that the light guide 63b is supported by the light-guide supporting member 214, and there is no problem for the positioning of it with respect to the corresponding solid-state light source.

Figure 20A:
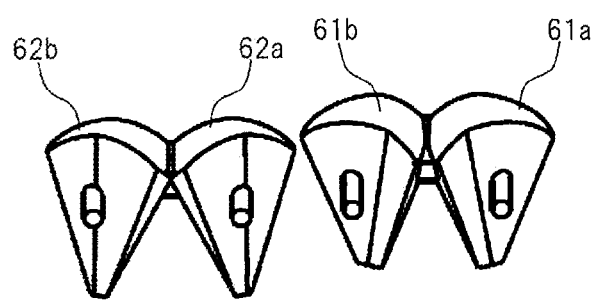
FIG. 20A is a diagram showing one example of a configuration of a light guide according to the third embodiment of the present invention.
Figure 20B:
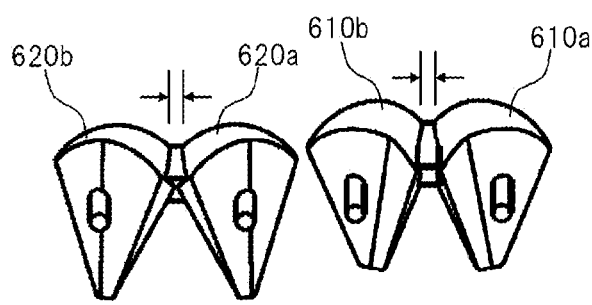
FIG. 20B is a diagram showing one example of the configuration of the light guide according to the third embodiment of the present invention.

FIGS. 20A and 20B are diagrams each showing one example of a configuration of the light guide according to the third embodiment of the present invention. FIG. 20A shows each configuration example of light guides 61a, 61b and 62a, 62b, and FIG. 20B shows each configuration example of light guides 610a, 610b and 620a, 620b as a comparative example of the light guides 61a, 61b and 62a, 62b. Note that FIGS. 20A and 20B show the light guides 61a, 61b and 62a, 62b as the example. However, the same goes for other light guides.

As shown in FIG. 20A, the light guides 61a and 61b are connected to each other and the light guides 62a and 62b are connected to each other so that the emitting ends of them abut on each other. In the manner, the arrangement space for the light guides can be reduced. On the other hand, in the comparative example shown in FIG. 20B, the light guide 610a and 610b are connected to each other, and the light guides 620a and 620b are connected to each other. However, the emitting ends of them do not abut on each other, and are arranged with a predetermined gap.

Each emitting end of the light guides 61a, 61b and 62a, 62b has a convex shape which is made of an aspherical surface or a free-form surface. Therefore, the shape of each emitting end of the light guides can be freely set, and therefore, the emitting direction of the image projection light (the image projection direction) can be more correctly adjusted.

Each emitting end of the light guides 61a, 61b and 62a, 62b has a convex curvature at a boundary portion that is smaller than a convex curvature at a center portion. In the manner, the image projection light can be effectively used, and the images can be more brightly displayed.

Figure 21:
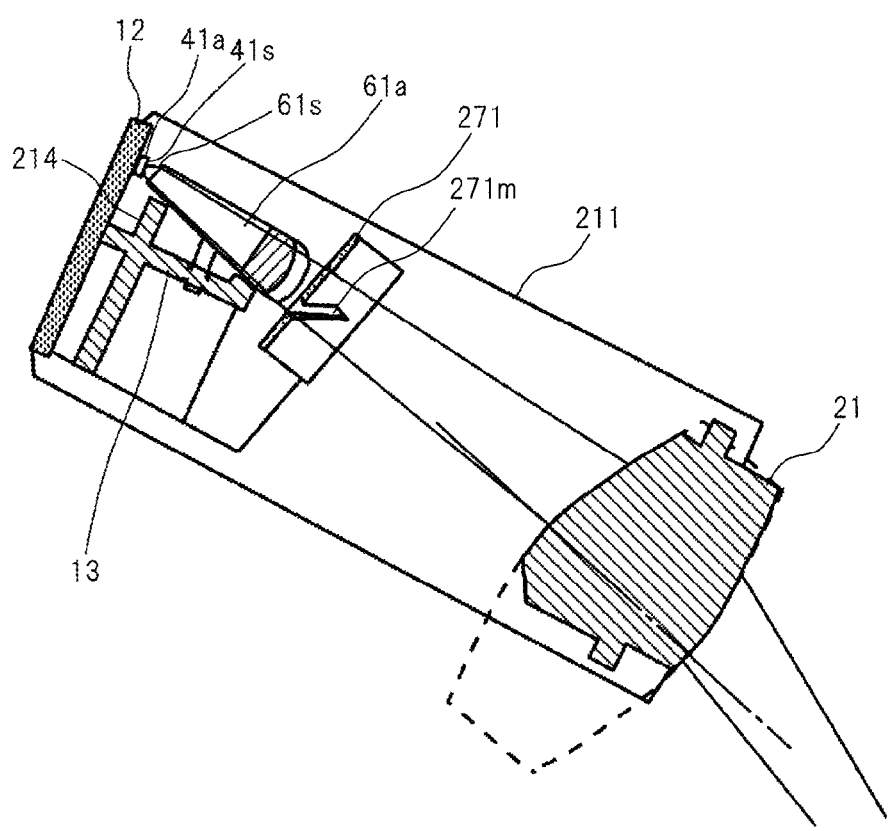
FIG. 21 is a diagram showing an example of the projection optical system according to the third embodiment of the present invention.

FIG. 21 is a diagram showing an example of the projection optical system according to the third embodiment of the present invention. FIG. 21 shows examples of the solid-state light source 41a and the light guide 61a of the projection optical system including the projection lens 21. The same configuration is applicable to the solid-state light source 41b and the light guide 61b. The projection optical system shown in FIG. 21 is similar to the projection optical system shown in FIG. 10. However, this projection optical system is different from that of FIG. 10 in that inclination of the incident end of at least one light guide is different from inclination of the emitting surface of the corresponding solid-state light source. Specifically, an emitting surface 41s of the solid-state light source 41a is not in parallel to an incident end 61s of the light guide 61a, and faces an upper side of the incident end 61s of the light guide 61a. Therefore, the image projection light emitted from the emitting surface 41s of the solid-state light source 41a enters the incident end 61s of the light guide 61a from a lower side.

According to this configuration, the arrangement of the light Guide 61a can be freely changed, and therefore, it is easy to adjust the light path of the image projection light. In the manner, the image can be projected onto the region near the car. And, in the manner, since the image projection light can be effectively used, the diffuser Plate 71d shown in FIG. 4 and others is unnecessary, and the configuration inside the case 211 is simplified.

Main effects according to the present embodiment will be described. According to the present embodiment, the projection lens 223 is an element of the plurality of projection optical systems. According to this configuration, the number of components inside the case 211 can be reduced, and therefore, the apparatus can be downsized, and a road sign projector also capable of handling the small arrangement space is provided.

Note that the present invention is not limited to the above-described embodiments, and include various modification examples. For example, the road sign projector 10 described here has four projection optical systems and displays the images onto four regions by using the projection optical systems that are different from one another. However, the road sign projector may have five or more projection optical systems, or may have two or three projection optical systems.

Each of the projection lenses 21 to 24 and 223 described here is made of one lens. However, each of them may be made of a plurality of lenses as long as suppressing increase in a cost. The road sign projector 10 described here is provided with the solid-state light sources corresponding to the projection optical systems, respectively. However, the configuration is not limited to such a configuration. For example, the light emitted from the headlights 2a and 3a may be taken in and used as the image projection light.

The road sign projector 10 can be arranged in not only the car 1 but also various places. For example, the road sign projector may be arranged in a movable thing such as the car 1, or may be fixed to a predetermined immovable place. In this specification, the case of the display of the arrow images is exemplified. However, different letters, symbols, patterns or others may be displayed as the images.

The light guides for the directional-indicator display may directly guide the image projection light from the corresponding solid-state light sources. In this case, the incident ends of the light guides and the incident ends of the light guides for the directional-indicator display are arranged in vicinity of the solid-state light sources. In this case, from a viewpoint of the heat resistance and others, each of the light guides for the directional-indicator display is preferably made of the same material as that of each of the light guides.

Also, a part of the structure of one embodiment can be replaced with the structure of another embodiment. And, the structure of another embodiment can be added to the structure of one embodiment. Further, another structure can be added to/eliminated from/replaced with a part of the structure of each embodiment. Note that each of the members and the relative sizes shown in the drawings is simplified and idealized for easily explaining the present invention, and may have a more complicated shape on the mounting in some cases.

Hereinafter, preferable aspects of the present invention will be stated.

[Statement 1]

In a road sign projector displaying images onto a plurality of regions of a road surface, the road sign projector includes: a shade configured to shape image projection light into a predetermined shape corresponding to the image for each of the regions; a plurality of projection lenses; and a solid-state light source correspondingly arranged to the plurality of projection lenses and configured to emit the image projection light, and the road sign projector further includes a light-Guiding member correspondingly arranged to each of the solid-state light sources and configured to guide the image projection light toward the shade.

[Statement 2]

In a road sign projector displaying images onto a plurality of regions of a road surface, the road sign projector includes: a shade configured to shape image projection light into a predetermined shape corresponding to the image for each of the regions; a plurality of projection lenses; a solid-state light source correspondingly arranged to the plurality of projection lenses and configured to emit the image projection light; a light-guiding member correspondingly arranged to each of the solid-state light sources and configured to guide the image projection light toward the shade; and a light-guiding-member fixing tool correspondingly arranged to each of the solid-state light sources and configured to position the light-guiding member, and the light-guiding-member fixing tool is fitted with the corresponding solid-state light source.

[Statement 3]

In a road sign projector displaying images onto a plurality of regions of a road surface, the road sign projector includes: a shade configured to shape image projection light into a predetermined shape corresponding to the image for each of the regions; a plurality of projection lenses; a solid-state light source correspondingly arranged to the plurality of projection lenses and configured to emit the image projection light; a light-guiding member correspondingly arranged to each of the solid-state light sources and configured to guide the image projection light toward the shade; and a light-guiding-member fixing tool correspondingly arranged to each of the solid-state light sources and configured to position the light-guiding member, and the light-guiding-member fixing tool is made of a heat-resistance resin.

[Statement 4]

In a road sign projector displaying images onto a plurality of regions of a road surface, the road sign projector includes: a shade configured to shape image projection light into a predetermined shape corresponding to the image for each of the regions; a plurality of projection lenses; a solid-state light source correspondingly arranged to the plurality of projection lenses and configured to emit the image projection light; a light-guiding member correspondingly arranged to each of the solid-state light sources and configured to guide the image projection light toward the shade; and a light-guiding-member fixing tool correspondingly arranged to each of the solid-state light sources and configured to position the light-guiding member, and the light-guiding-member fixing tool includes an air intake hole.

[Statement 5]

In a vehicle lamp including: a road sign projector displaying images onto a plurality of regions of a road surface; and a directional indicator, the road sign projector has: a shade configured to shape image projection light into a predetermined shape corresponding to the image for each of the regions; and a projection lens corresponding to each of the regions, the directional indicator has a directional-indicator display unit corresponding to each of the regions, and each of the directional-indicator display units displays a directional indicator when the image is displayed in the corresponding region.

[Statement 6]

In the vehicle lamp described in the Statement 5, the projection lenses are different from one another in at least one of a focal length and axial inclination.

[Statement 7]

In the vehicle lamp described in the Statement 5, an emitting end of the light-guiding member has a convex surface.

[Statement 8]

In the vehicle lamp described in the Statement 5, a plurality of the light-guiding members are connected to one another.

[Statement 9]

In the vehicle lamp described in the Statement 5, a gap between the solid-state light source and the corresponding light-guiding member is filled with a heat-resistance transparent member.

[Statement 10]

In the vehicle lamp described in the Statement 8, the heat-resistance transparent member is made of silicon resin.

[Statement 11]

In the vehicle lamp described in the Statement 5, at least one of the projection lenses has a cutting-out portion.

[Statement 12]

In the vehicle lamp described in the Statement 5, the shade corresponding to each of the regions is arranged.

[Statement 13]

In the vehicle lamp described in Statement 12, a region of the shade from a center portion to a circumferential portion curves toward the corresponding projection lens.

[Statement 14]

The vehicle lamp described in the Statement 5 further includes a light-guiding-member fixing tool correspondingly arranged to each of the solid-state light sources and configured to position the light-guiding member.

[Statement 15]

In the vehicle lamp described in the Statement 14, the light-guiding-member fixing tool is made of heat-resistance resin.

[Statement 16]

In the vehicle lamp described in the Statement 5, the road sign projector includes: a solid-state light source correspondingly arranged to each of the plurality of projection lenses and configured to emit the image projection light; and a light-guiding member correspondingly arranged to each of the solid-state light sources and configured to guide the image projection light toward the shade, and the directional indicator includes a light-guiding member for directional-indicator display arranged for the corresponding directional-indicator display unit and configured to guide the image projection light toward the corresponding directional-indicator display unit.

[Statement 17]

In the vehicle lamp described in the Statement 16, an incident end of the light-guiding member for the directional-indicator display is arranged in vicinity of an emitting end of the corresponding light-guiding member, and the solid-state light source emitting the image projection light also functions as the solid-state light source displaying the directional indicator.

[Statement 18]

In the vehicle lamp described in the Statement 17, the shade has an opening corresponding to the incident end of the light-guiding member for the directional-indicator display.

[Statement 19]

In the vehicle lamp described in the Statement 18, each of the light-guiding member and the directional-indicator light-guiding member is a light guide.

What is claimed is:

1. A road sign projector displaying images onto a plurality of regions of a road surface, comprising:
   a shade configured to shape image projection light into a predetermined shape corresponding to the image for each of the regions;
   a plurality of projection lenses;
   a solid-state light source correspondingly arranged to each of the plurality of projection lenses and configured to emit the image projection light; and
   a plurality of light-guiding members each correspondingly arranged to each of the solid-state light sources and configured to guide the image projection light toward the shade,
   wherein each of the projection lenses is illuminated by the plurality of solid-state light sources, and
   wherein each the plurality of the light-guiding members are connected to one another at a side opposite the solid-state light source.

2. The road sign projector according to claim 1, wherein the plurality of projection lenses are different from one another in at least one of a focal length and axial inclination.

3. The road sign projector according to claim 2, wherein at least one of the projection lenses has a shape that is Off-Axis as well as being cut off at a portion out of an effective area.

4. The road sign projector according to claim 1, wherein at least one of the plurality of projection lenses has a function of projecting at least two regions of the plurality of regions.

5. The road sign projector according to claim 1, wherein the plurality of light-guiding members are made of a heat-resistance material.

6. The road sign projector according to claim 1, wherein an emitting end of each the plurality of light-guiding members have a convex surface.

7. The road sign projector according to claim 6, wherein an emitting end of each the plurality of light-guiding members have a convex surface which is made of an aspherical surface or a free-form surface.

8. The road sign projector according to claim 7, wherein a convex curvature at a boundary portion of the emitting end of each the plurality of light-guiding members are smaller than a convex curvature at a center portion thereof.

9. The road sign projector according to claim 6, wherein inclination of an incident end of at least one of the plurality of light-guiding members is different from inclination of an emitting surface of the corresponding solid-state light source.

10. The road sign projector according to claim 1, wherein a gap between each of the plurality of solid-state light sources and the corresponding each of the plurality of light-guiding members is filled with a heat-resistance transparent member.

11. The road sign projector according to claim 1,
wherein a region of the shade from a center portion to a circumferential portion curves toward the corresponding projection lens.

12. The road sign projector according to claim 1 further comprising
a light-guiding-member fixing tool correspondingly arranged to each of the solid-state light sources and configured to position each of the plurality of light-guiding members.

13. A vehicle lamp comprising:
a road sign projector displaying images onto a plurality of regions of a road surface; and
a directional indicator,
wherein a light source of the road sign projector and a light source of the directional indicator are a common solid-state light source,
the road sign projector has:
a shade configured to shape image projection light into a predetermined shape corresponding to the image for each of the regions;
a projection lens corresponding to each of the regions, and
a plurality of the light-guiding members are connected to one another at a side opposite the solid-state light source
the directional indicator has a directional-indicator display unit corresponding to each of the regions, and
each of the directional-indicator display units displays a directional indicator when the image is displayed in the corresponding region.

* * * * *